United States Patent
Kornbluth et al.

(10) Patent No.: US 12,107,277 B2
(45) Date of Patent: Oct. 1, 2024

(54) ELECTROCHEMICAL CELL CATALYST LAYERS

(71) Applicant: Robert Bosch GmbH, Stuttgart (DE)

(72) Inventors: Mordechai Kornbluth, Brighton, MA (US); Daniil A Kitchaev, Brookline, MA (US); Jonathan Braaten, Sunnyvale, CA (US); Lei Cheng, San Jose, CA (US); Christina Johnston, Spanish Fort, AL (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/841,896

(22) Filed: Jun. 16, 2022

(65) Prior Publication Data

US 2023/0411628 A1  Dec. 21, 2023

(51) Int. Cl.
| | |
|---|---|
| *H01M 4/86* | (2006.01) |
| *C25B 9/23* | (2021.01) |
| *C25B 11/031* | (2021.01) |
| *C25B 11/037* | (2021.01) |
| *C25B 11/051* | (2021.01) |

(Continued)

(52) U.S. Cl.
CPC ............. *H01M 4/8626* (2013.01); *C25B 9/23* (2021.01); *C25B 11/031* (2021.01); *C25B 11/037* (2021.01); *C25B 11/051* (2021.01); *C25B 11/065* (2021.01); *H01M 4/9083* (2013.01);

(Continued)

(58) Field of Classification Search
CPC .. H01M 4/8626; H01M 4/926; H01M 4/9083; H01M 2004/8689; H01M 4/8605; H01M 4/861; H01M 2008/1095; C25B 9/23; C25B 11/031; C25B 11/037; C25B 11/051; C25B 9/065; Y02E 60/50
See application file for complete search history.

(56) References Cited

U.S. PATENT DOCUMENTS

| | | | |
|---|---|---|---|
| 7,220,514 B2 | 5/2007 | Yasumoto et al. | |
| 7,488,547 B1 * | 2/2009 | Iacovelli | H01M 8/083 429/434 |

(Continued)

FOREIGN PATENT DOCUMENTS

WO   2022071321 A1   4/2022

OTHER PUBLICATIONS

Ohira, A., Kuroda, S., Mohamed, H. F., & Tavernier, B. "Effect of interface on surface morphology and proton conduction of polymer electrolyte thin films." Physical Chemistry Chemical Physics, 15(27), 11494-11500. (2013).

(Continued)

*Primary Examiner* — Eugenia Wang
(74) *Attorney, Agent, or Firm* — BROOKS KUSHMAN P.C.

(57) ABSTRACT

An electrochemical cell cathode catalyst layer includes electrocatalyst particles, an electrocatalyst support having an electronically conductive porous material including a plurality of pores with a diameter of less than or equal to 10 nm having a surface morphology comprising a plurality of peaks and valleys, the surface morphology being configured to contain the electrocatalyst particles within the plurality of pores and to enhance mass transport of molecular oxygen to the electrocatalyst particles by adsorbing molecular oxygen to the surface morphology, and an ionomer adhered to the electrocatalyst, the electrocatalyst support, or both.

9 Claims, 16 Drawing Sheets

(51) Int. Cl.
  *C25B 11/065*  (2021.01)
  *H01M 4/90*  (2006.01)
  *H01M 4/92*  (2006.01)
  *H01M 8/10*  (2016.01)

(52) U.S. Cl.
  CPC .... *H01M 4/926* (2013.01); *H01M 2004/8689* (2013.01); *H01M 2008/1095* (2013.01)

(56) References Cited

U.S. PATENT DOCUMENTS

| | | |
|---|---|---|
| 8,455,557 B2 | 6/2013 | Linder et al. |
| 2004/0248730 A1 | 12/2004 | Kim et al. |
| 2005/0014643 A1* | 1/2005 | Lini .................. H01M 4/622 502/432 |
| 2009/0197133 A1 | 8/2009 | Hamaguchi |
| 2013/0149632 A1 | 6/2013 | Yoo et al. |
| 2018/0331372 A1* | 11/2018 | Hirabayashi ........ H01M 8/1004 |
| 2018/0345265 A1* | 12/2018 | Wang .................. B01J 23/20 |
| 2020/0321622 A1 | 10/2020 | Sharman et al. |
| 2021/0020953 A1 | 1/2021 | Martinez Bonastre et al. |

OTHER PUBLICATIONS

Wood III, D. L., Chlistunoff, J., Majewski, J., & Borup, R. L. "Nafion structural phenomena at platinum and carbon interfaces." Journal of the American Chemical Society, 131(50), 18096-18104. (2009).

Niu, Zhiyin, et al. "Manipulation of PEDOT: PSS with Polar and Nonpolar Solvent Post-treatment for Efficient Inverted Perovskite Solar Cells." ACS Applied Energy Materials 3.10, 9656-9666. (2020).

Oh, K. H., & Bae, I. "Engineered Membrane-Electrode Interface for Hydrocarbon-Based Polymer-Electrolyte-Membrane Fuel Cells via Solvent-Vapor-Annealed Deposition." ACS Applied Nano Materials, 2(6), 3857-3863. (2019).

Gotrik, K. W., Hannon, A. F., Son, J. G., Keller, B., Alexander-Katz, A., & Ross, C. A. "Morphology control in block copolymer films using mixed solvent vapors." ACS nano, 6(9), 8052-8059. (2012).

Castelino, P., Jayarama, A., Bhat, S., Fernandes, P., Prabhu, S., Duttagupta, S., & Pinto, R. "Role of UV irradiated Nafion in power enhancement of hydrogen fuel cells." International Journal of Hydrogen Energy, 46(50), 25596-25607. (2021).

Zhou, B., Pu, H., Pan, H., & Wan, D. "Proton exchange membranes based on semi-interpenetrating polymer networks of Nation® and poly (vinylidene fluoride) via radiation crosslinking." International journal of hydrogen energy, 36(11), 6809-6816. (2011).

Lue, S. J., Shiang-Yiaw H., and Ta-Chin W. "Surface modification of perfluorosulfonic acid membranes with perfluoroheptane (C7F16)/ argon plasma." Journal of Membrane Science 305.1-2 (2007): 226-237.

International Search Report dated Aug. 22, 2023 which issued in related PCT application No. PCT/EP2023/064872, filed Jun. 2, 2023. 4 pages.

NPL_International Search Report dated Sep. 4, 2023 for related PCT Application No. PCT/EP2023/064934. 4 pages.

NPL_Nurettin Sezer, "Oxidative acid treatment of carbon nanotubes," Surfaces and Interfaces 14 (2019) 1-8.

NPL_Youn Soo Kim et al., "Insight into the Origin of the Positive Effects of Imadazolium Salt on Electrocatalytic Activity: Ionic Carbon Nanotubes as Metal-Free Electrocatalyts for Oxygen Reduction Reaction," Chem. Asian J. Aug. 2013, 232-237.

* cited by examiner

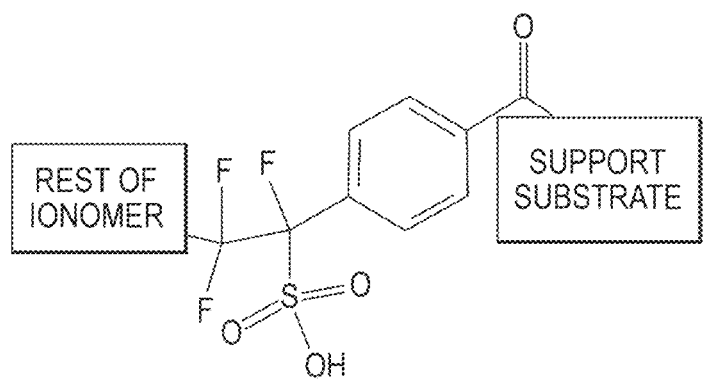
FIG. 13D
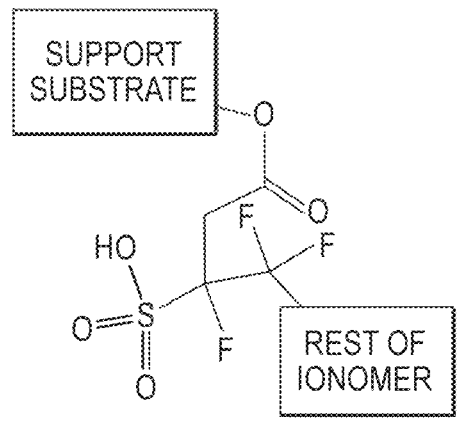
FIG. 13E
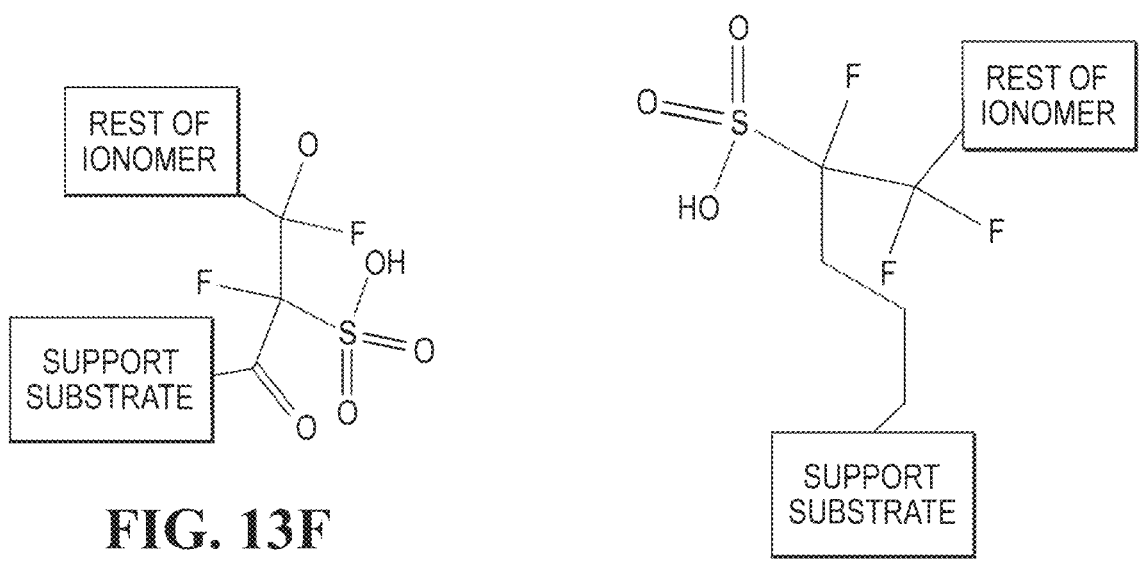
FIG. 13F
FIG. 13G

ELECTROCHEMICAL CELL CATALYST LAYERS

TECHNICAL FIELD

The present disclosure relates to materials and structures of catalyst layers in chemical and electrochemical cells and methods of using and making the same.

BACKGROUND

With an ever-increasing growing interest in green technologies worldwide, electrochemical cells such as fuel cells and electrolyzers are top candidates for various applications. Yet many challenges need to be resolved prior to widespread electrochemical cell implementation. Among the challenges are material corrosion and deterioration, catalyst cost and dissolution as well as factors influencing effectiveness and efficiency of the cells such as oxygen transport within the cell layers.

SUMMARY

In at least one embodiment, an electrochemical cell cathode catalyst layer (CCL) is disclosed. The CCL may include electrocatalyst particles and an electrocatalyst support having an electronically conductive porous material. The material may include a plurality of pores with a diameter of less than or equal to 10 nm having a surface morphology including a plurality of peaks and valleys. The surface morphology may be configured to contain the electrocatalyst particles within the plurality of pores and to enhance mass transport of molecular oxygen to the electrocatalyst particles by adsorbing molecular oxygen to the surface morphology. The CCL may further include an ionomer adhered to the electrocatalyst, the electrocatalyst support, or both. The surface morphology may include an inconsistently spaced apart peaks and valleys. The peaks and valleys may form a tire tread-like pattern. The surface morphology may include a plurality of high frequency, short spatial wavelengths between the peaks and valleys. The catalyst support may be a carbon-based electrocatalyst support. At least some of the electrocatalyst particles may be housed on the peaks. The surface morphology may include a regular, repeating pattern of the peaks and valleys. The surface morphology may include about 10 to 50% of peaks having an equal height. The plurality of pores may include at least two pores having the same surface morphology.

In another embodiment, an electrochemical cell is disclosed. The cell includes an anode, a membrane spatially separating the anode from a cathode, and the cathode including a cathode catalyst layer having an electrocatalyst support including a plurality of mesopores having a first surface morphology including a warped surface forming a plurality of asperities and concavities, the first surface morphology arranged to contain an electrocatalyst. The asperities and concavities may alternate in a regular pattern. The electrocatalyst support may be a carbon-based support. The plurality of asperities may form an alligator skin-like morphology. The mesopores may have a diameter of up to about 10 nm. The electrocatalyst support may further include additional pores having a second surface morphology being free of asperities and concavities.

In yet another embodiment, an electrocatalyst support is disclosed. The support may include a first roughened surface morphology comprising a plurality of mesopore asperities spaced apart from one another, the roughened surface having a first surface roughness. The support may further include a second surface morphology comprising macropores, the second surface morphology having a second surface roughness lesser than the first surface roughness. A frequency and wavelength between at least a portion of the asperities may be regular. The second surface morphology may further include non-porous surface. The first roughened surface morphology may further include micropores. The first roughened surface morphology may also include a plurality of concavities adjacent to the asperities.

Figure 7A:
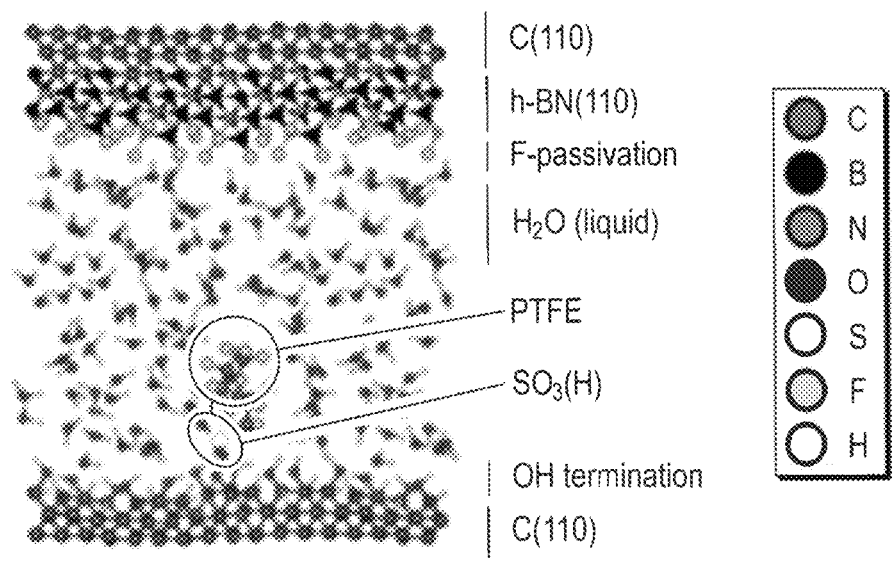
FIG. 7A shows a molecular dynamics (MD) simulation between carbon substrate and hydrophilic groups of an ionomer.
Figure 7B:
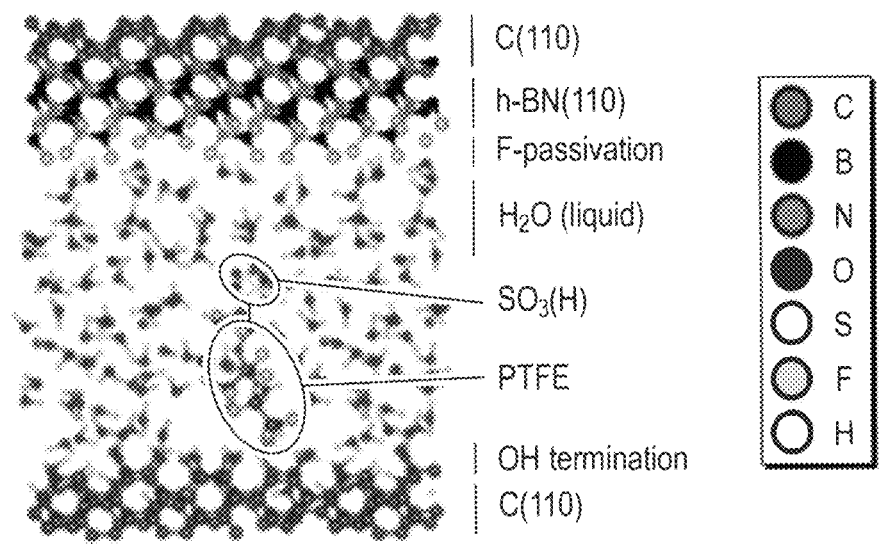
Figure 8:
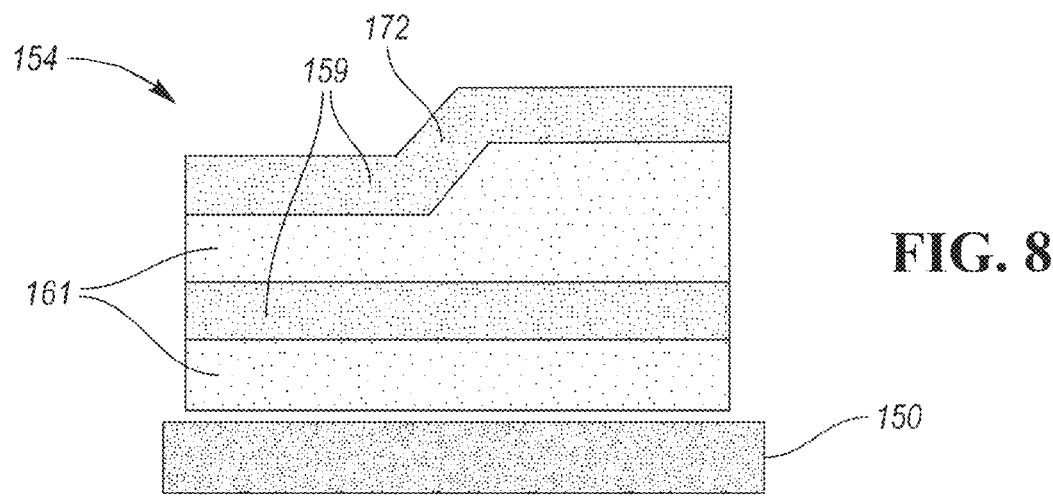
Figure 9:
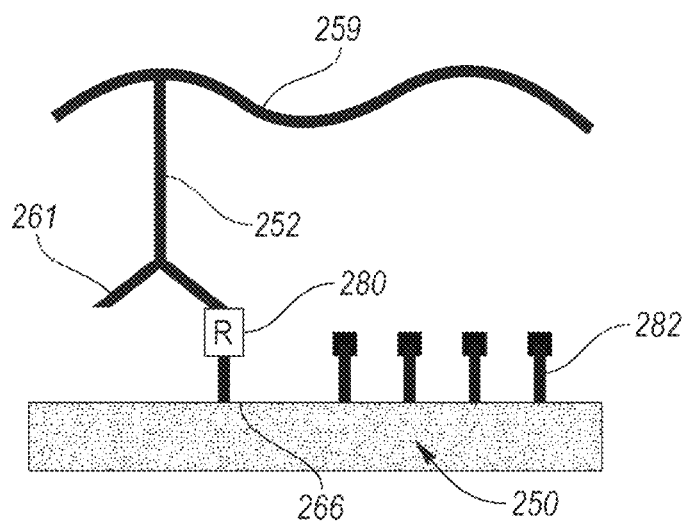
Figure 10:
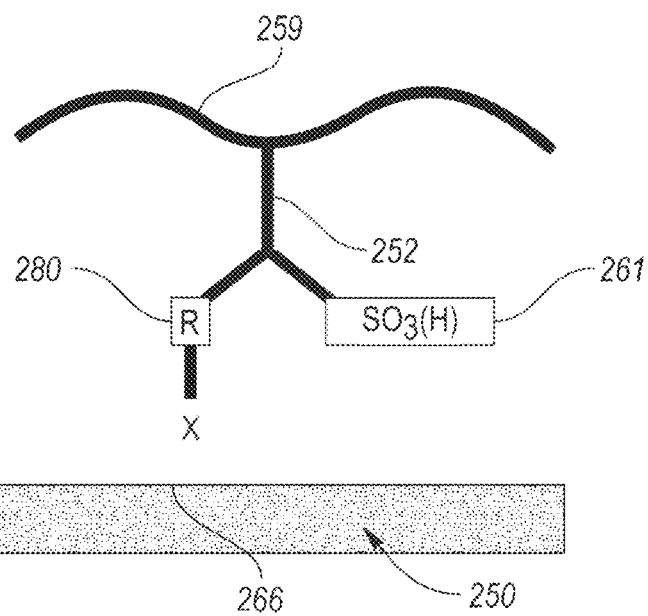
Figure 11:
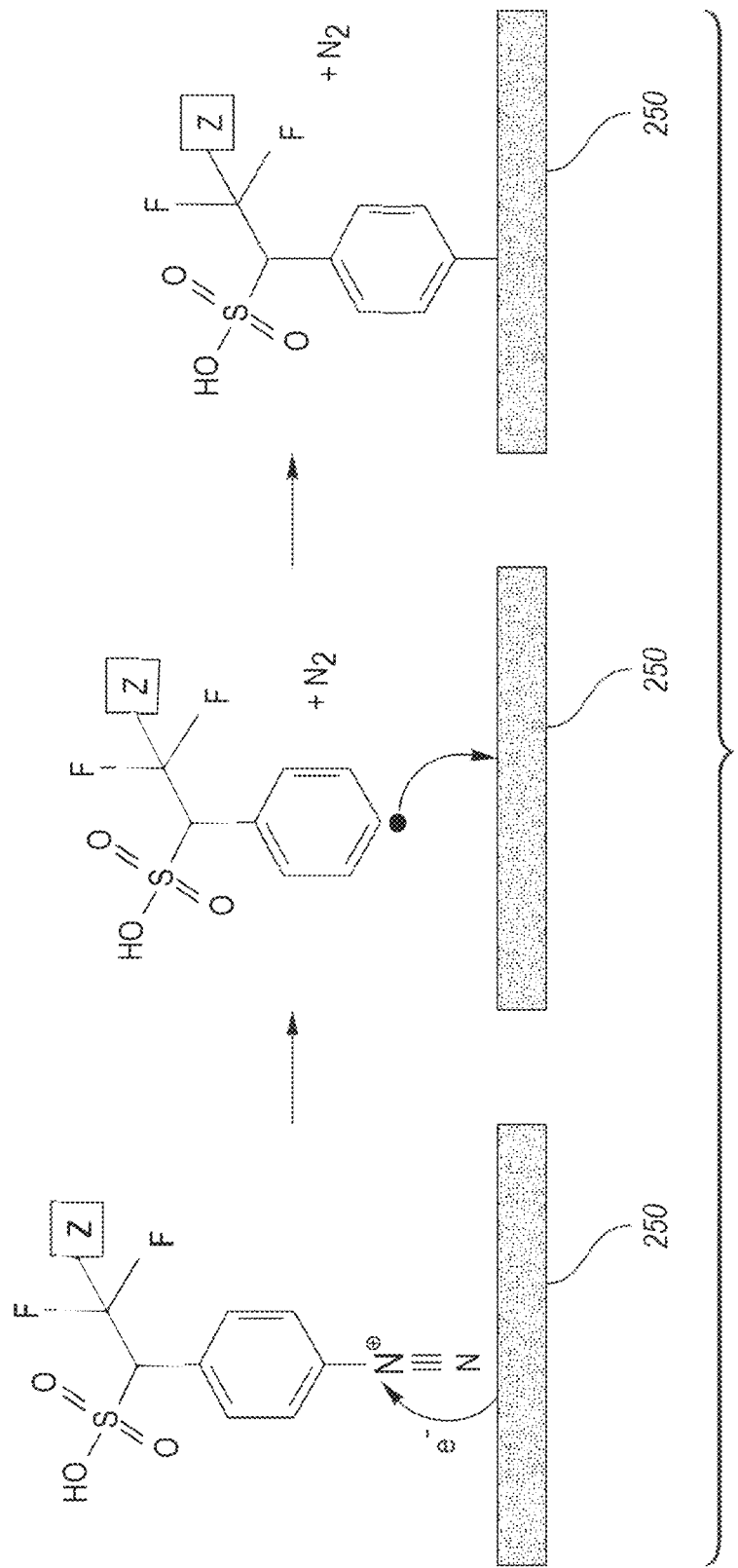
Figure 12A:
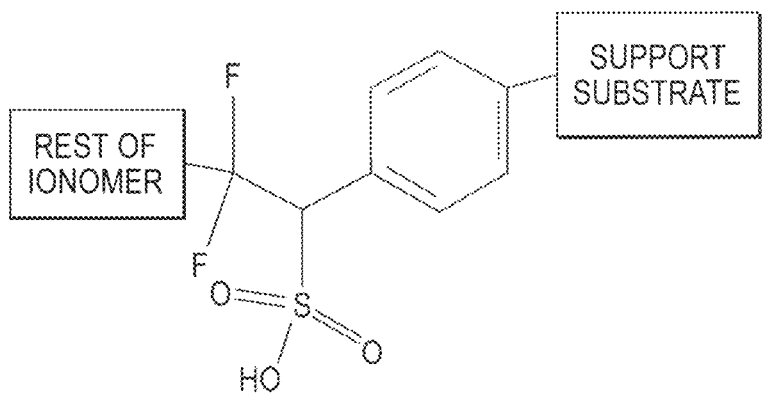
Figure 12B:
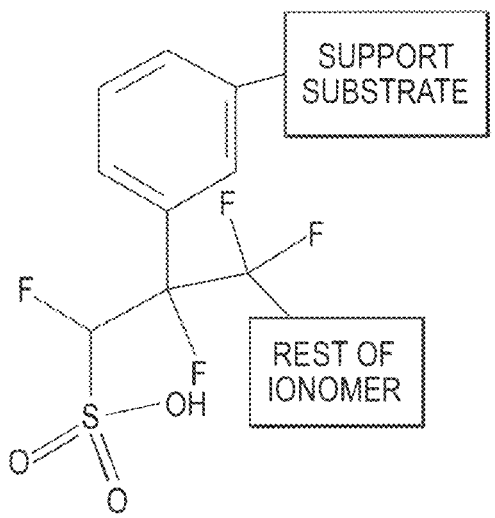
Figure 12C:
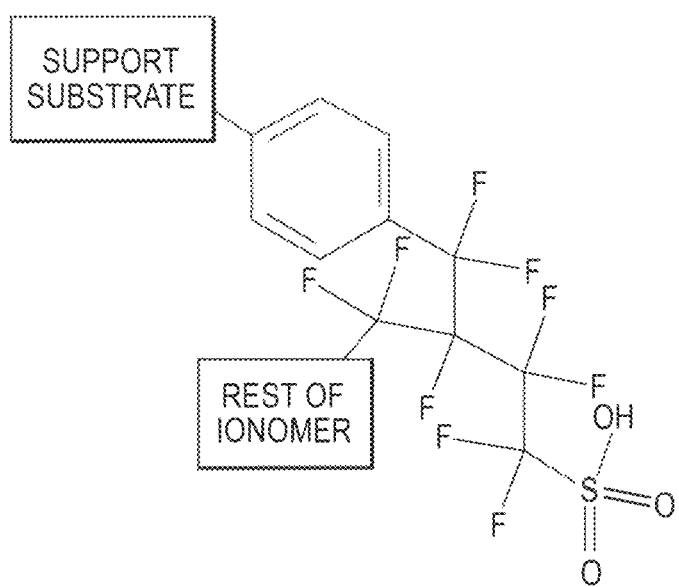
Figure 14:
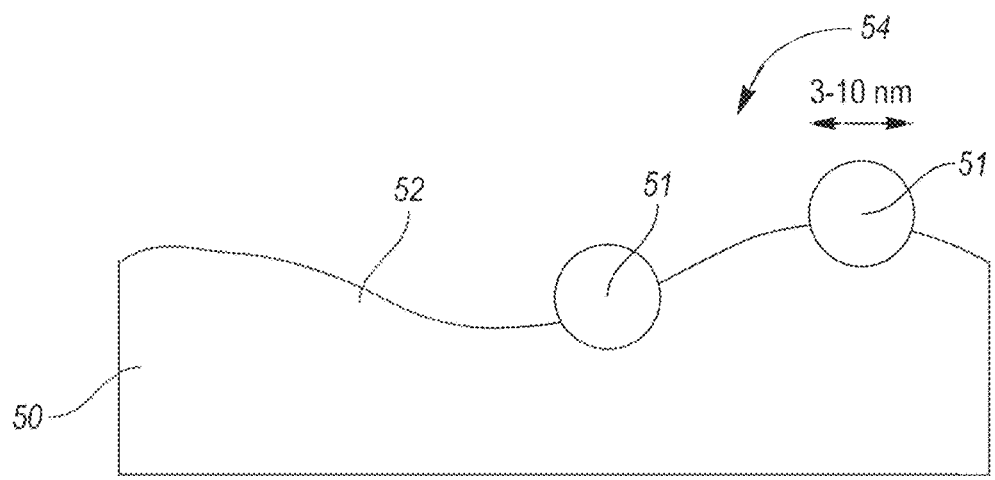
Figure 15:
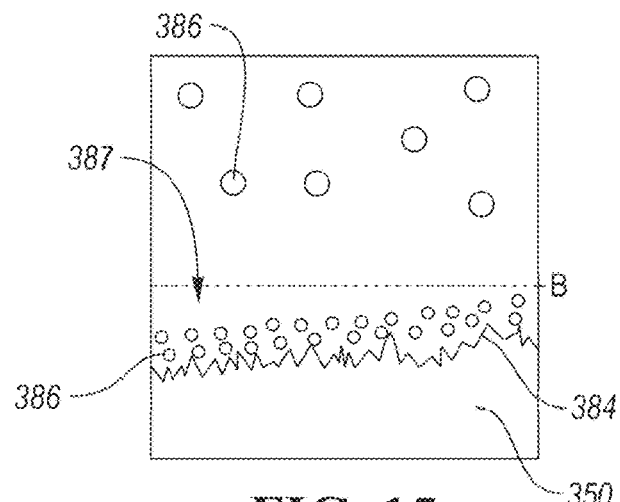
Figure 16:
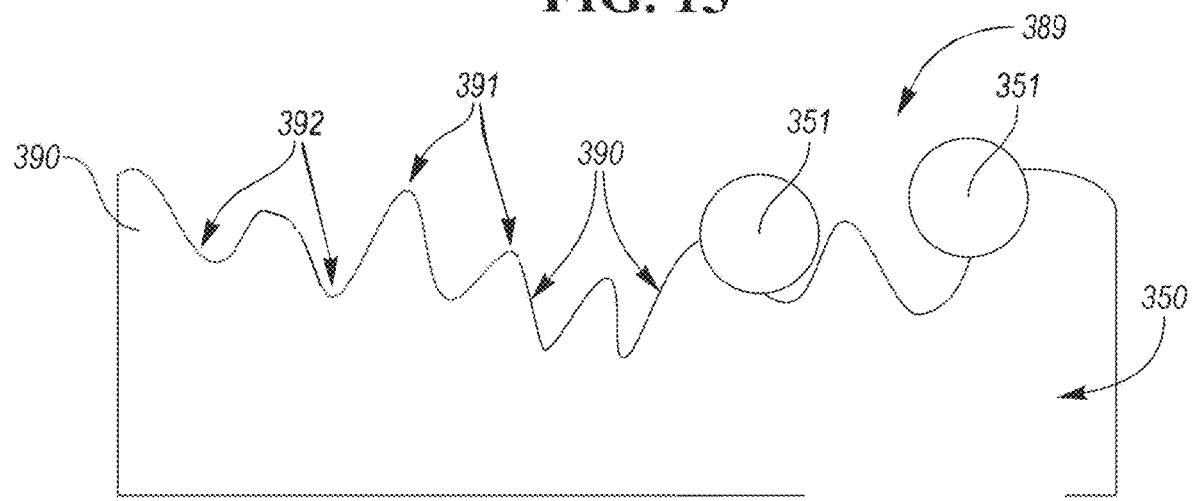
Figure 17:
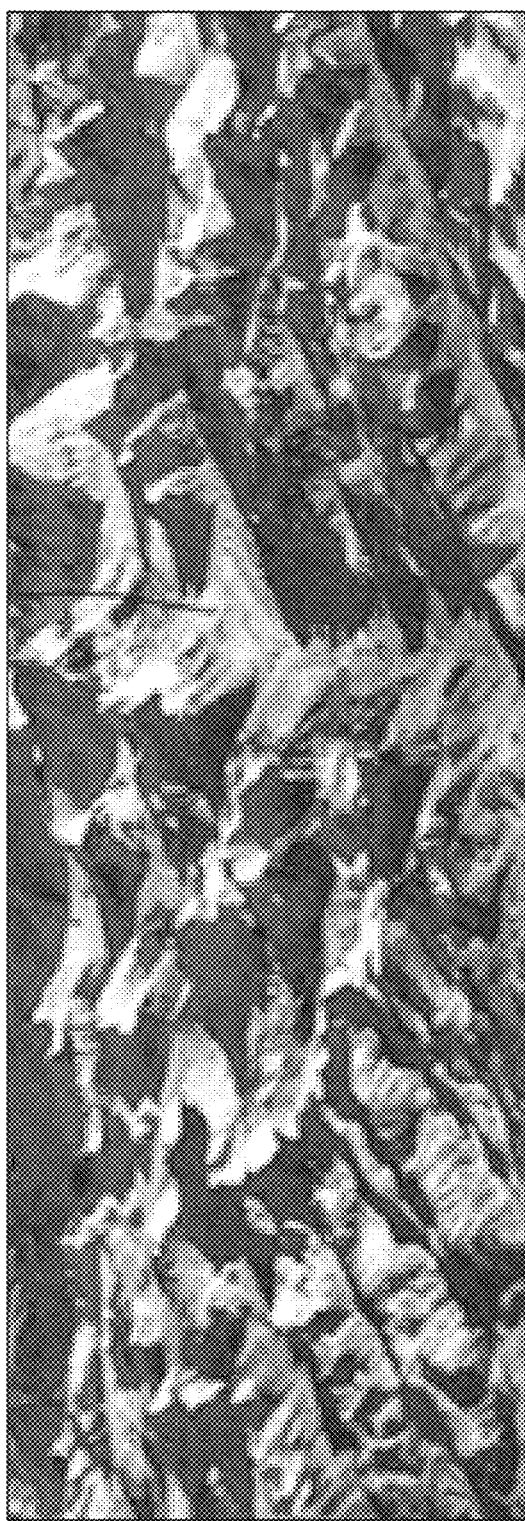
Figure 18A:
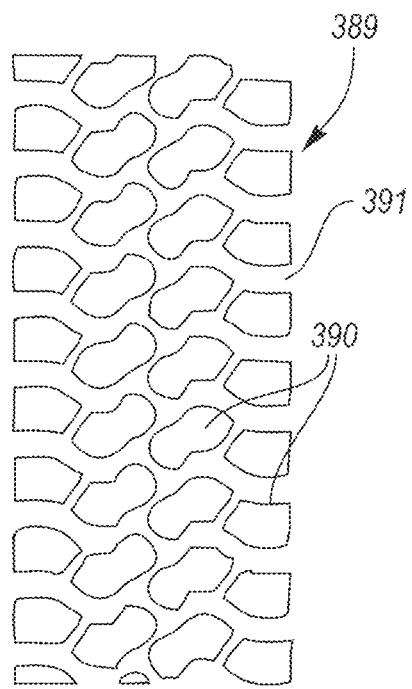
Figure 18B:
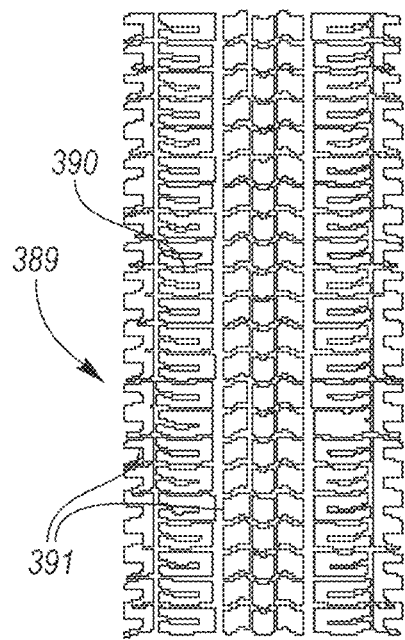
Figure 18C:
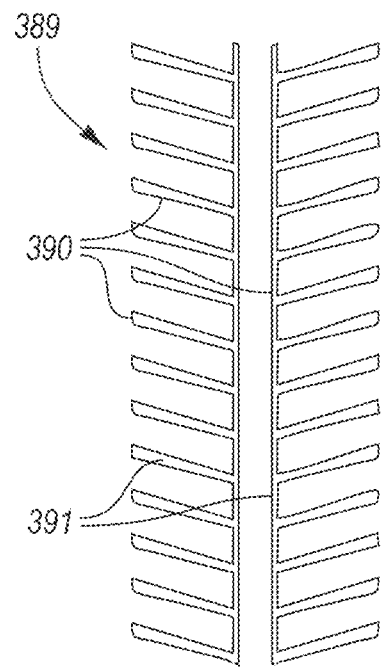
Figure 19A:
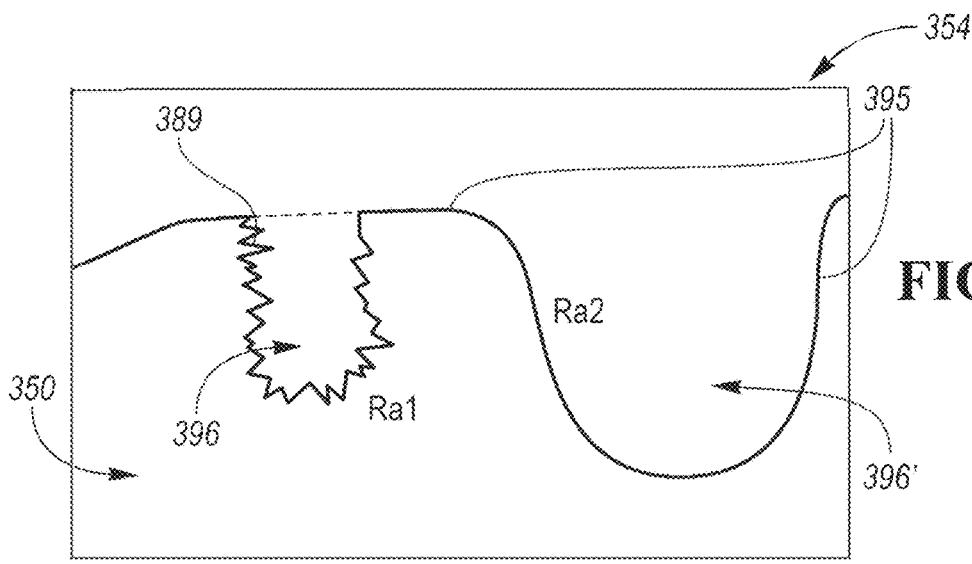
Figure 19B:
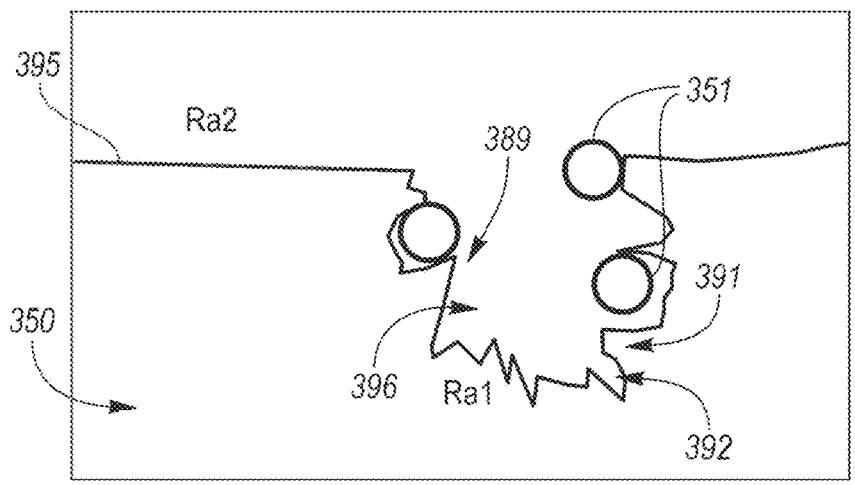
Figure 20:
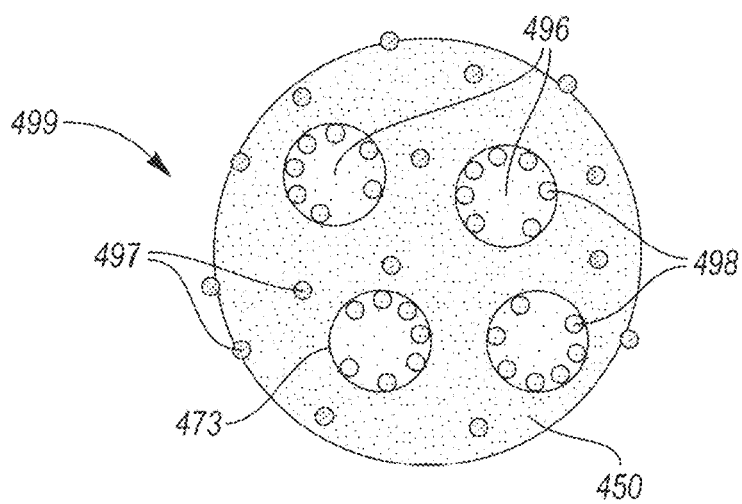
Figure 21A:
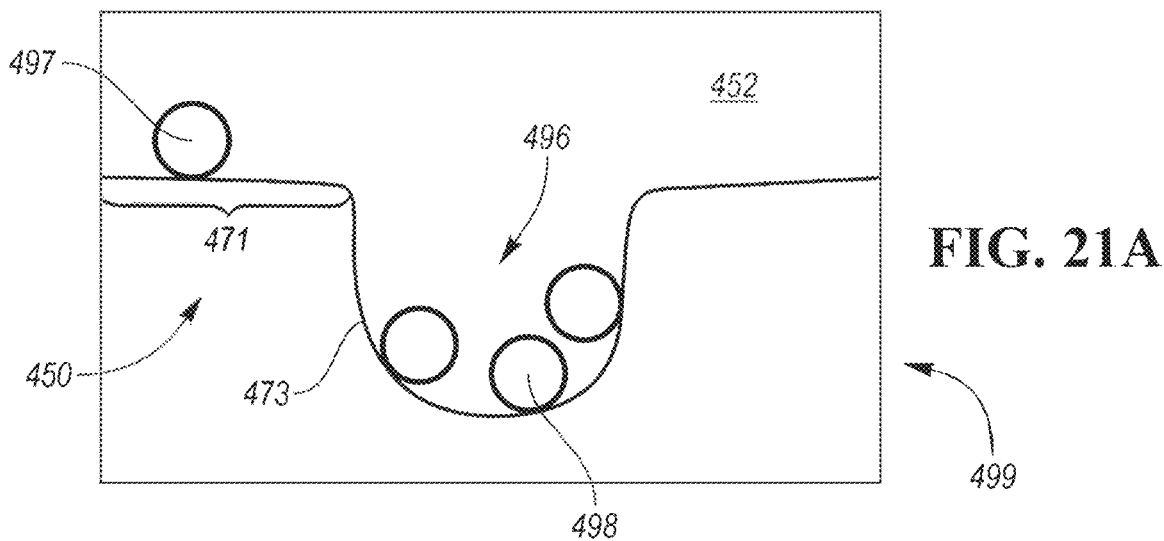
Figure 21B:
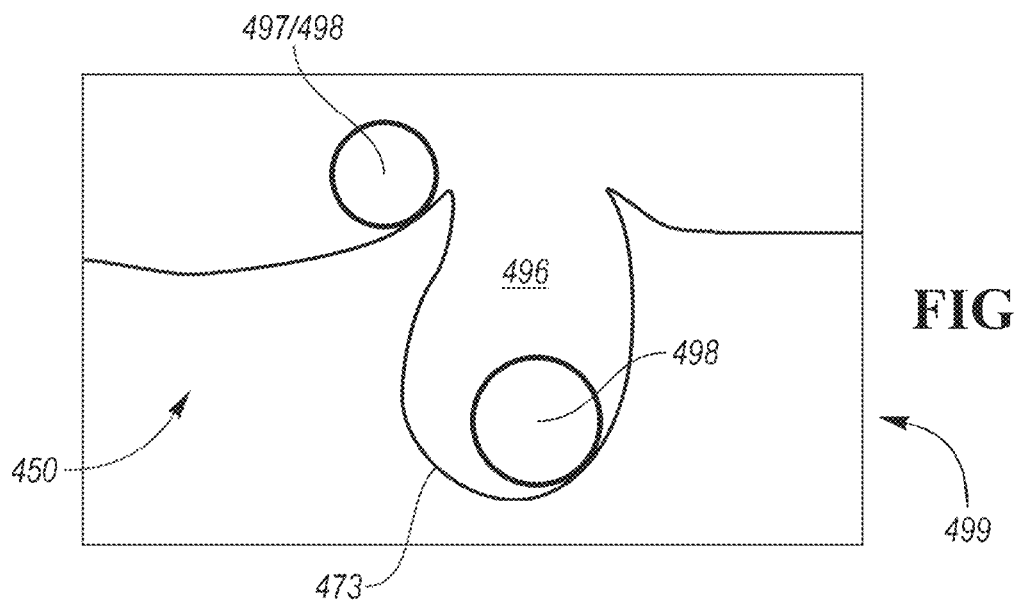
Figure 22:
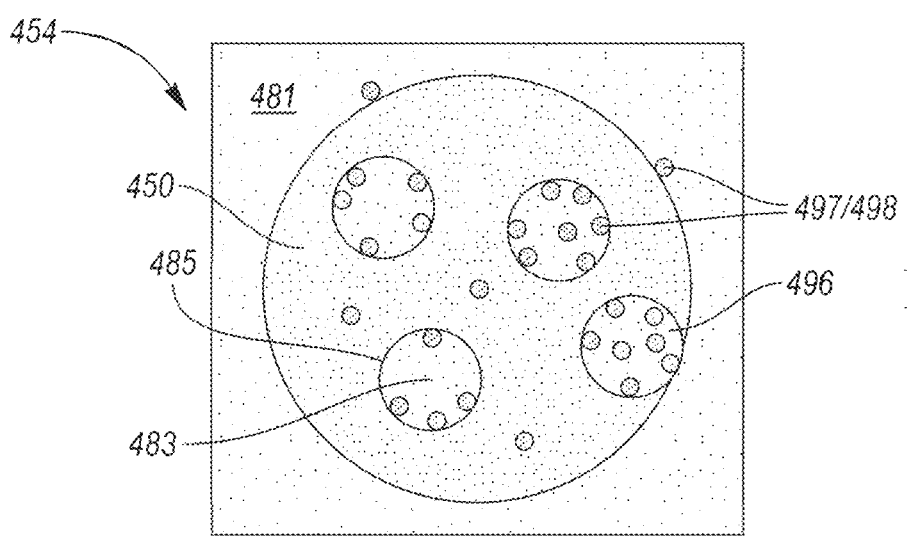
Figure 23A:
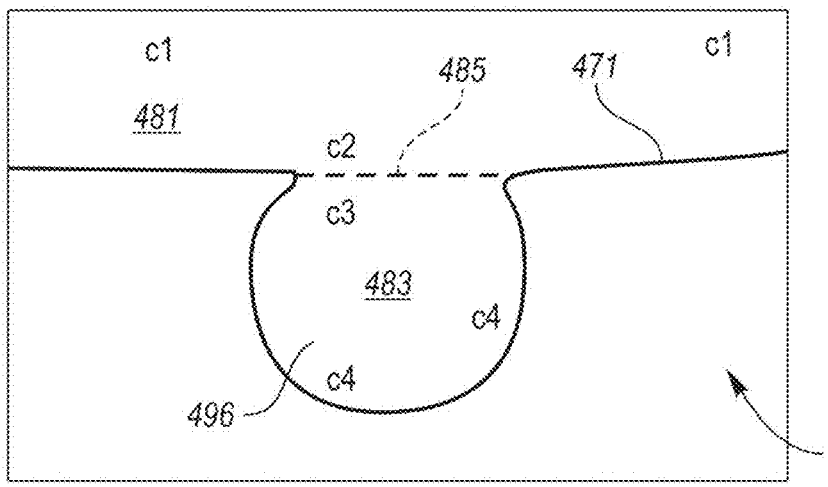
Figure 23B:
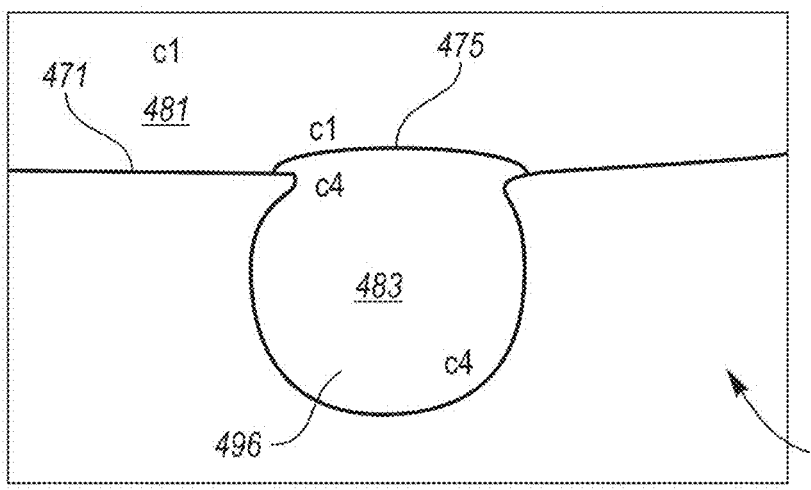
Figure 24:
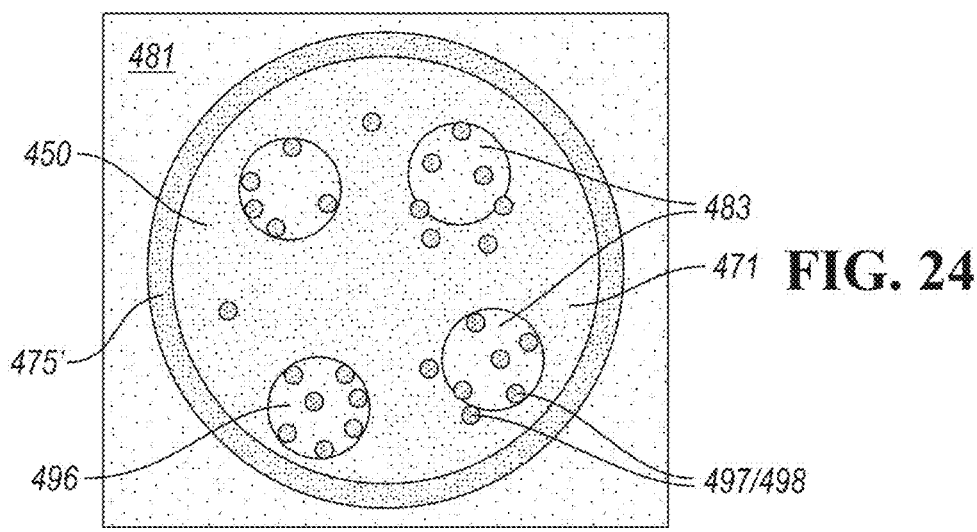

an ionomer;

FIG. 7B shows MD simulation between carbon substrate and hydrophobic groups of FIG. 8 shows a non-limiting example of a CCL having lamellar structure and a hydrophobic outer layer;

FIG. 9 shows an alternative substrate-ionomer interface according to one or more embodiments;

FIG. 10 is a schematic of a functionalized ionomer with a compound having a reactive and leaving groups;

FIG. 11 shows steps of a non-limiting example reaction mechanism including a diazonium-functionalized ionomer according to one or more embodiments disclosed herein;

FIGS. 12A-C depict various configurations of the reactive group within ionomer chains;

FIGS. 13A-13G show carbon-ionomer interface with covalent bond facilitated via various chemistries disclosed herein;

FIG. 14 shows a prior art substrate having a smooth surface profile;

FIG. 15 is a schematic depiction of a boundary layer adjacent to the first surface morphology of the substrate;

FIG. 16 shows a non-limiting example of the first surface morphology profile;

FIG. 17 depicts a perspective side view of a non-limiting example of the mountain range-like first surface morphology;

FIGS. 18A-18C show a top view of non-limiting examples of tire tread-like first surface morphology;

FIG. 19A shows a schematic depiction of a non-limiting example of a support substrate having the first surface morphology and the second surface morphology disclosed herein;

FIG. 19B shows a schematic depiction of a non-limiting example of a support substrate having the first surface morphology with attached electrocatalyst particles and the second surface morphology disclosed herein;

FIG. 20 shows a top schematic view of a non-limiting example support substrate having a multi-electrocatalyst system according to one or more embodiments disclosed herein;

FIG. 21A shows a schematic view of a support substrate having a non-porous and porous surface and a non-limiting example of a multi-electrocatalyst system;

FIG. 21B shows another non-limiting example of the multi-electrocatalyst system on the support substrate;

FIG. 22 shows a non-limiting example of a CCL having a multi-electrolyte system according to one or more embodiments disclosed herein;

FIG. 23A shows a non-limiting example of a multi-electrolyte system and its interface;

FIG. 23B shows a non-limiting example of a multi-electrolyte system having a cap; and FIG. 24 depicts a top view of a CCL having a multi-electrolyte system with a cap.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed.

The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

It must also be noted that, as used in the specification and the appended claims, the singular form "a," "an," and "the" comprise plural referents unless the context clearly indicates otherwise. For example, reference to a component in the singular is intended to comprise a plurality of components.

As used herein, the term "substantially," "generally," or "about" means that the amount or value in question may be the specific value designated or some other value in its neighborhood. Generally, the term "about" denoting a certain value is intended to denote a range within +/−5% of the value. As one example, the phrase "about 100" denotes a range of 100+/−5, i.e. the range from 95 to 105. Generally, when the term "about" is used, it can be expected that similar results or effects according to the invention can be obtained within a range of +/−5% of the indicated value. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits. Similarly, whenever listing integers are provided herein, it should also be appreciated that the listing of integers explicitly includes ranges of any two integers within the listing.

In the examples set forth herein, concentrations, temperature, and reaction conditions (e.g., pressure, pH, flow rates, etc.) can be practiced with plus or minus 50 percent of the values indicated rounded to or truncated to two significant figures of the value provided in the examples. In a refinement, concentrations, temperature, and reaction conditions (e.g., pressure, pH, flow rates, etc.) can be practiced with plus or minus 30 percent of the values indicated rounded to or truncated to two significant figures of the value provided in the examples. In another refinement, concentrations, temperature, and reaction conditions (e.g., pressure, pH, flow rates, etc.) can be practiced with plus or minus 10 percent of the values indicated rounded to or truncated to two significant figures of the value provided in the examples.

For all compounds expressed as an empirical chemical formula with a plurality of letters and numeric subscripts (e.g., $CH_2O$), values of the subscripts can be plus or minus 50 percent of the values indicated rounded to or truncated to two significant figures. For example, if $CH_2O$ is indicated, a compound of formula $C_{(0.8-1.2)}H_{(1.6-2.4)}O_{(0.8-1.2)}$. In a refinement, values of the subscripts can be plus or minus 30 percent of the values indicated rounded to or truncated to two significant figures. In still another refinement, values of the subscripts can be plus or minus 20 percent of the values indicated rounded to or truncated to two significant figures. The terms "compound" and "composition" are used interchangeably.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

The term "one or more" means "at least one" and the term "at least one" means "one or more." The terms "one or more" and "at least one" include "plurality" as a subset.

The description of a group or class of materials as suitable for a given purpose in connection with one or more embodiments implies that mixtures of any two or more of the members of the group or class are suitable. Description of constituents in chemical terms refers to the constituents at the time of addition to any combination specified in the description and does not necessarily preclude chemical interactions among constituents of the mixture once mixed. First definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

Chemical and electrochemical systems utilizing hydrogen as a fuel source are considered the energy systems of the future either in direct hydrogen combustion engines or fuel cells. These hydrogen-producing devices are becoming increasingly popular due to their ability to produce clean energy. The systems may include fuel cells, electrolysis cells or electrolyzers, and battery cells. Fuel cells, or electrochemical cells, that convert chemical energy of a fuel (e.g. $H_2$) and an oxidizing agent into electricity through a pair of electrochemical half (redox) reactions, have become an increasingly popular hydrogen-fuel-generating technology. Fuel cells are now a promising alternative transportation technology capable of operating without emissions of either toxins or green-house gases.

Figure 1A:
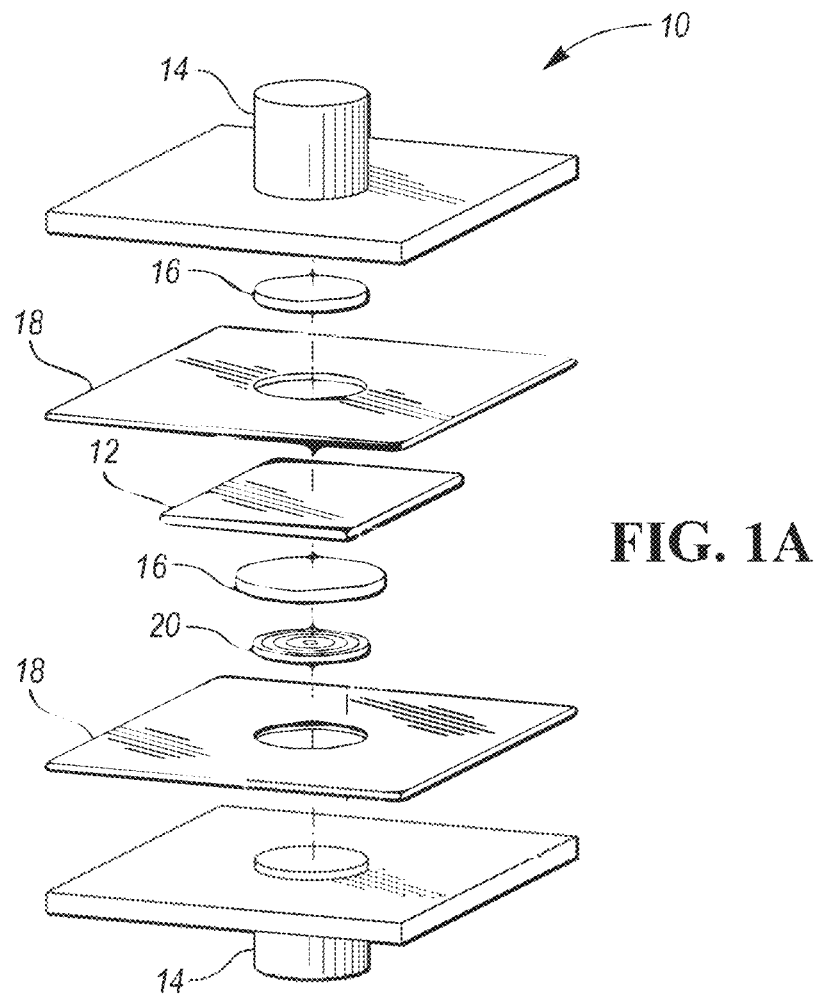
FIG. 1A shows a non-limiting example of a fuel cell and its components in an exploded view.
Figure 1B:
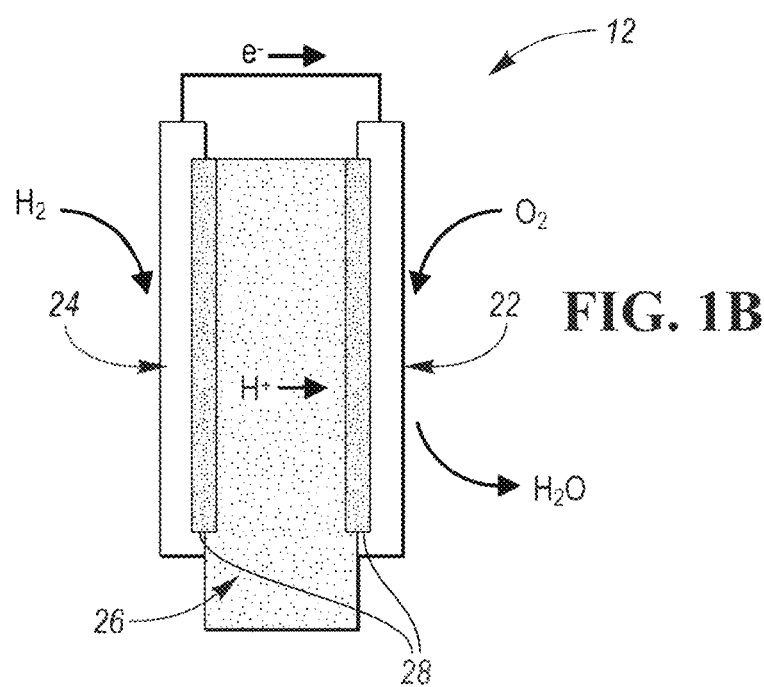
FIG. 1B shows a schematic depiction of a membrane electrode assembly (MEA) and its functioning principle.

A non-limiting example of a fuel cell, a proton-exchange membrane fuel cell (PEMFC) is depicted in FIG. 1A. A core component of the PEMFC 10 that helps produce the electrochemical reaction needed to separate electrons is the Membrane Electrode Assembly (MEA) 12. The MEA 12 includes subcomponents such as catalyst-coated cathode 22 and anode 24 electrodes separated by a proton-conductive ionomer or ionomer membrane 26; catalyst is denoted as 28 in a schematic depiction of MEA in FIG. 1B. Besides MEA 12, the PEMFC 10 typically includes other components such as current collectors 14, gas diffusion layer(s) 16, gaskets 18, and bipolar plate(s) 20.

The anode performs the hydrogen oxidation reaction (1) while the cathode performs the oxygen reduction reaction (2):

$$H_2 \rightarrow 2H^+ + 2e^- \quad (1)$$

$$4H^+ + O_2 + 4e^- \rightarrow H_2O \quad (2)$$

Generally, the $H_2$ is broken down on the surface of the electrocatalyst in the anode to form protons and electrons in a hydrogen oxidation reaction (HOR). The electrons are transported through the support of the anode catalyst layer to the external circuit while the protons are pulled through the proton exchange membrane (PEM) to the cathode catalyst layer. Once in the catalyst layer, the protons move through the ion-conducting polymer or ionomer thin-film network to the electrocatalyst surface, where they combine with the electrons from the external circuit and the $O_2$ that has diffused through the pores of the cathode catalyst layer (CCL) to form water in the oxygen reduction reaction (ORR).

Besides fuel cells, electrolyzers present another type of an electrochemical cell. Electrolyzers use electrical energy to conduct chemical reactions. Electrolyzers undergo an electrolysis process to split water into hydrogen and oxygen, providing a promising method for hydrogen generation from renewable resources. An electrolyzer, like a fuel cell, includes an anode and cathode catalyst layers separated by an electrolyte membrane. The electrolyte membrane may be a polymer, an alkaline solution, or a solid ceramic material. A catalyst material is included in the anode and cathode catalyst layers of the electrolyzer.

Besides fuel cells, the electrolyzer may be utilized in other applications including industrial, residential, and military applications and technologies focused on energy storage such as electrical grid stabilization from dynamic electrical sources including wind turbines, solar cells, or localized hydrogen production.

Figure 2A:
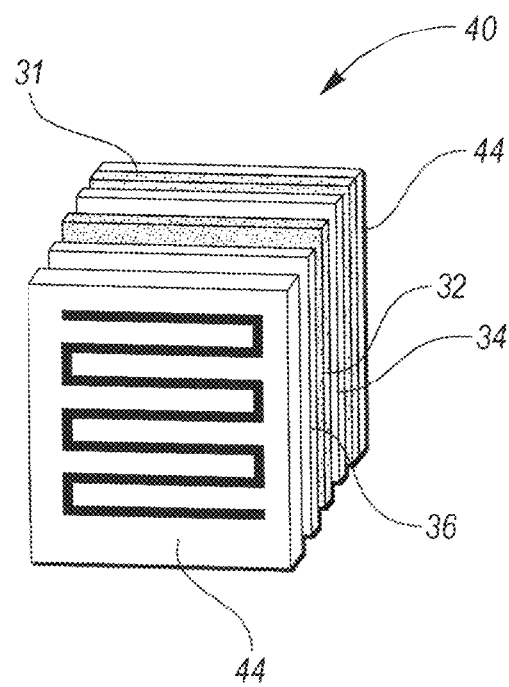
FIG. 2A shows a schematic view of a non-limiting example of an electrolyzer stack.

A typical single electrolyzer is composed of an electrolyte membrane, an anode layer, and a cathode layer separated from the anode layer by the electrolyte membrane. A non-limiting schematic depiction of an electrolyzer stack 40 is shown in FIG. 2A. The electrolyzer stack 40 includes individual electrolyzer cells 31, each of which includes the membrane 32, electrodes 34, 36, and bipolar plates 44. A catalyst material, such as Pt-based catalysts, is included in the anode and cathode layers 34, 36 of the electrolyzer stack 40. At the anode layers 34, $H_2O$ is hydrolyzed to $O_2$ and $H^+$ ($2H_2O \rightarrow O_2 + 4H^+ + 4e^-$). At the cathode layers 36, $H^+$ combines with electrons to form $H_2$ ($4H^+ + 4e^- \rightarrow 2H_2$).

Figure 2B:
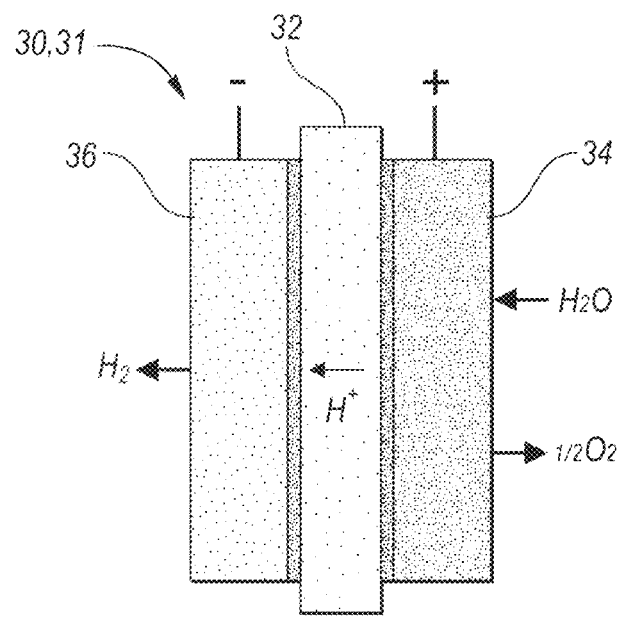
FIG. 2B is a schematic depiction of the electrolysis principle.
Figure 2B:
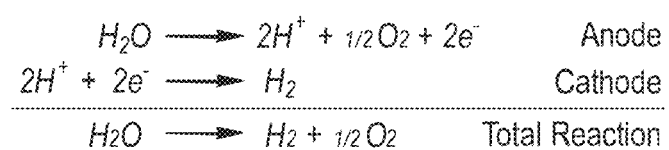

A depiction of the electrolysis principle, utilized by a proton exchange membrane (PEM) electrolyzer 30, with relevant reactions is depicted in FIG. 2B. The electrolyzer 30 includes the PEM 32, anode 34, and cathode 36. Each electrode includes a porous transport layer (PTL) and a catalyst layer. During electrolysis, water is broken down into oxygen and hydrogen in anodic and cathodic electrically driven evolution reactions. The reactant liquid water ($H_2O$) permeates through the anode 34 PTL to the anode catalyst layer, where the oxygen evolution reaction (OER) occurs. The protons ($H^+$) travel via the PEM 32, and electrons (e−) conduct through an external circuit during the hydrogen evolution reaction (HER) at the cathode 36 catalyst layer.

The anodic OER requires a much higher overpotential than the cathodic HER. It is the anodic OER which determines efficiency of the water splitting due to the sluggish nature of its four-electron transfer.

Figure 3:
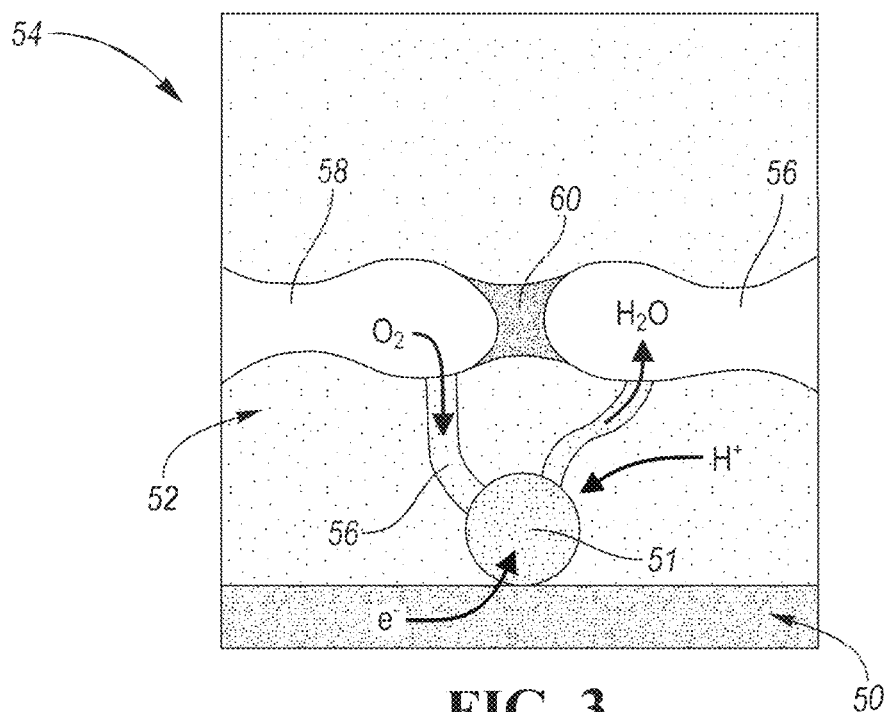
FIG. 3 shows a schematic view of a cathode catalyst layer (CCL) with various types of transport and water-ionomer interactions within the layer.

Generally, a high rate of the ORR and OER is desirable. Achieving a high rate of the reaction at the cathode requires that oxygen, protons, and electrons be transported to the catalyst particles, while the generated water be transported away from the reaction zone. Under low current densities, where water exists predominantly as vapor, the transport is resolved by (a) electron transport through the catalyst 51 support 50, (b) proton transport through the ionomer 52 dispersed in the cathode catalyst layer (CCL) 54, and (c) oxygen and water transport through the porous network 56 of the CCL 54, as is schematically shown in FIG. 3.

But under high current densities, the vaporization capabilities of the CCL 54 are exceeded by the water generation rate. The transport regime tips over from vapor to liquid transport. A liquid pressure gradient builds up. Depending on the wettability of the pore network 56, the CCL 54 may be partially flooded with liquid water. The liquid water may then block secondary pores 58 in the CCL 54, impeding oxygen transport, as is shown in FIG. 3. The blockage is shown as a wetting droplet 60. The wetting droplet 60 represents a water-ionomer interaction in a hydrophilic system, where the droplets wet the ionomer surface and are sessile, fixed in place, not moving, within the pore network, thus blocking transport through the secondary pores and culminating in flooding as more water droplets accumulate within the network 56. The impeded oxygen transport in turn limits the cathode reaction rate and thus the overall electrochemical cell power output.

Additionally, a typical ionomer, or ion-conducting polymer, includes a hydrophobic backbone terminating in hydrophilic sidechains. Typically, the ionomer has a very complex structure such as an inverted micelle, the backbone being collapsed and the hydrophilic groups facing in, forming an interconnected water domain at relatively high water activities. The hydrophilic domains serve as a pathway for proton and other transport. The hydrophobic backbone may provide structural rigidity.

In the thin films of the CCL, the hydrophobic and hydrophilic groups may be oriented randomly, haphazardly, resulting in formation of the hydrophilic surfaces where such surfaces may be undesirable. Hence, in typical ionomer thin film networks of the CCL, a desirable hydrophobic effect is not present because of the following factors: (1) the ionomer does not fully coat the support, thus exposing hydrophilic portions of the substrate, (2) the layers, especially the outer-most layer, of the ionomer is free to orient and re-orient itself and expose the hydrophilic side-chains and thus generate an overall hydrophilic surface leading to flooding, or both. Such principles are illustrated in FIG. 4.

While ionomers are known to relatively strongly adhere to catalyst nanoparticles, the adhesion to the support itself is typically weak, resulting in regions of exposed substrate such as carbon especially in regions of high porosity or local curvature. The incomplete coverage is problematic especially in high-surface-area carbons with a low catalyst loading due to the lower surface density of the catalyst and insufficient hydrophobicity of the potentially exposed carbon support.

Figure 4:
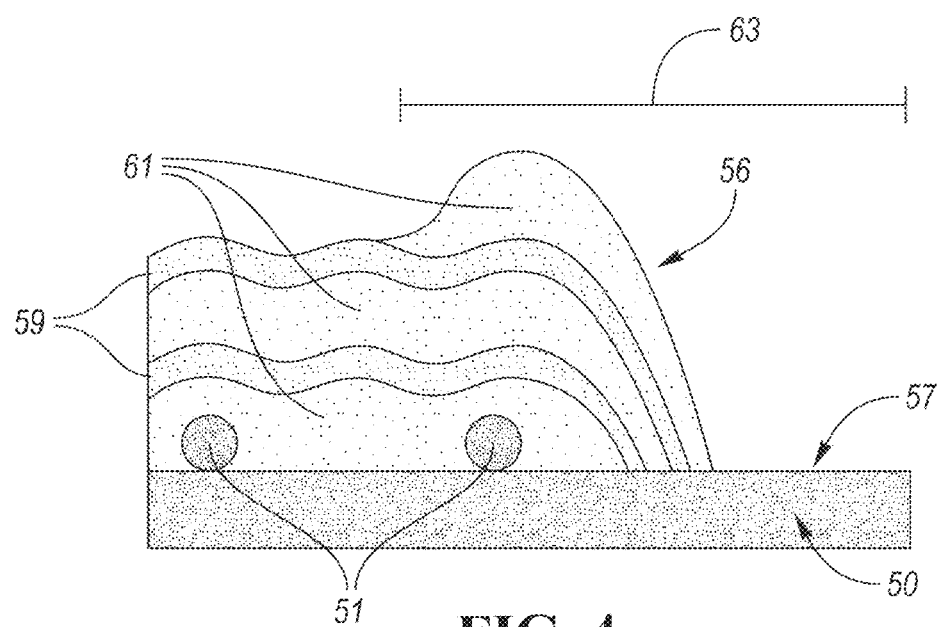
FIG. 4 shows a traditional coverage of carbon substrate with ionomer resulting in exposed carbon surface and ionomer hydrophilic outer layers.

As can be seen in FIG. 4, the substrate/catalyst matrix 50/51 is only partially surrounded by the ionomer. A portion 57 of the support substrate 50 is exposed. The ionomer 56, where present, is shown with the hydrophilic backbone 59 and hydrophilic sidechains 61. As a result of the described conditions, the CCL has a relatively large portion having a hydrophilic outer surface, which may attract water, accumulate water, and lead to lower than desirable oxygen transport. The area prone to flooding in FIG. 4 is denoted 63.

Therefore, there is a need to enable effective oxygen transport via the CCL, to prevent flooding of the catalyst layer, CCL, ionomer, porous network within the ionomer, or a combination thereof as much as possible.

In one or more embodiments, an electrochemical cell system is disclosed. The system may be a fuel cell or electrolyzer. The system includes components described above with respect to fuel cells and electrolyzers. The system includes a cathode having a CCL. The CCL may include or comprise a substrate, a catalyst, an ionomer. The system is structured to prevent flooding of the catalyst layer, CCL, ionomer, porous network within the ionomer, or a combination thereof as much as possible. The system is thus structured to provide increased oxygen transport via the CCL.

Throughout this disclosure, the substrate may be carbon. The carbon substrate may have a plurality of forms and variations such as graphite, graphene, nitrogen-doped graphite, carbon black, electro-conductive carbon black, activated carbon fibers, fullerenes, nanotubes, nanofibers, the like, or a combination thereof. The substrate may include amorphous and crystalline formations. The substrate may be a porous substrate having a plurality of pores including macropores, mesopores, and/or micropores. The substrate may thus include an outer non-porous surface and pores dispersed within the non-porous surface and having a variable depth and diameter. Alternatively, the support may be a metal oxide or metal such as cobalt oxide, aluminum oxide, titanium oxide, the like, or a combination thereof. The support material may have a variety of morphologies and desirable properties such as high surface area, conductivity, low grit content, the like, or a combination thereof.

The electrocatalyst may be a precious metal catalyst such as Pt, Pd, or their combination. The catalyst may include an alloy such as PtM alloy, where M is a transition metal such as Co, Mn, Ti, Ni, Al, Fe, Cu, Ru, Mo, etc. The catalyst may include Ir, Ru, Ir-M, or Ru-M alloy where M is one of the aforementioned elements, or an oxide of the above. In some embodiment, the catalyst may primarily include Ni, Cu, Co, their oxides, or a combination thereof.

The ionomer may include one or more materials. Non-limiting examples of the ionomer include Nafion™ or sulfonated tetrafluoroethylene based fluoropolymer-copolymer, a high-oxygen permeability ionomer (HOPI), nonfluorinated arene-based polymers such as poly(arylene sulfone), or their combination. A non-limiting example of the hydrophobic backbone may include polytetrafluoroethylene (PTFE) and the hydrophilic, polar sidechains may include sulfonate.

The CCL may be partially, substantially completely, or completely free of flooding, wetting droplets, water blockages, or a combination thereof. Partially may mean that at least about or more than about 50, 60, 70, 80, 90, or 95% of the CCL area, porous network area, is free of unwanted flooding, wetting droplets, water blockages, or a combination thereof.

Figure 5:
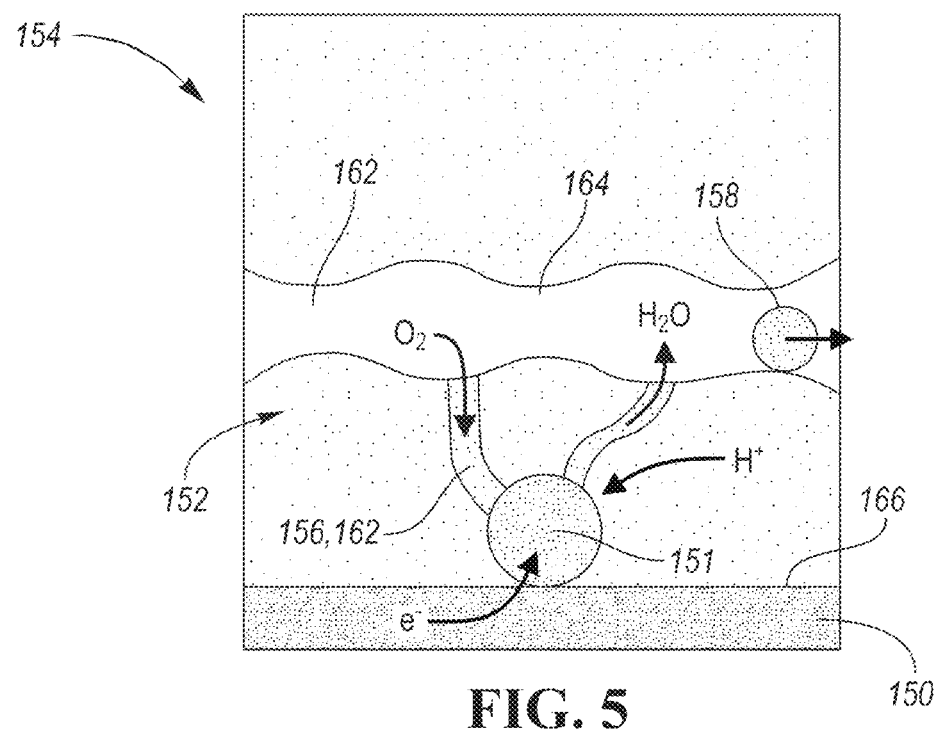
FIG. 5 shows a non-limiting embodiment of a CCL disclosed herein.

A non-limiting example of the CCL disclosed herein is shown in FIG. 5. The CCL 154 may include an ionomer 152 and a porous network 156 within the ionomer 152, as is depicted in FIG. 5. The porous network 156 may include one or more channels or pores 162 for $O_2$ and water transport. The channels or pores 162 may be interconnected. The channels or pores 162 may be regular, irregular, have irregular, regular, or variable dimensions such as length, width, or both throughout their length. The channels or pores 162 may include macropores, mesopores, micropores, or a combination thereof.

In one or more embodiments, the CCL 154 may include a number of layers. A first layer may be the substrate 150 and/or the substrate/catalyst matrix 150. The second layer may be the ionomer 152. The second layer may form a thin film, a lamellar structure, or both. The ionomer layer 152 may be closely and/or evenly adherent to the substrate 150. The film may be uniform, having uniform dimensions such as thickness. The film may keep the uniform dimensions even when the surface has curvatures, imperfections, protrusions, depressions, or the like. The film may closely adhere to any surface structure of the sub state or substrate/catalyst matrix. The adherence of the film to the substrate or substrate/catalyst interface is even, complete, full, or a combination thereof. The ionomer coating 152 may be uniform, free of interruptions, be in direct contact with the substrate 150 throughout at least a portion or the entire area of contact between the substrate and the ionomer. The ionomer allows for proton transport to and within the CCL.

The ionomer-substrate interface 166 may be free of gaps, interruptions such that the substrate is substantially entirely covered with the ionomer. The interface is also free of exposed carbon hydrophilic groups, which could potentially result in unwanted accumulation of water and subsequent ionomer flooding. The interface may be free of an exposed substrate or substrate/catalyst matrix including areas of high porosity, curvature, uneven surface, or a combination thereof.

Figure 6:
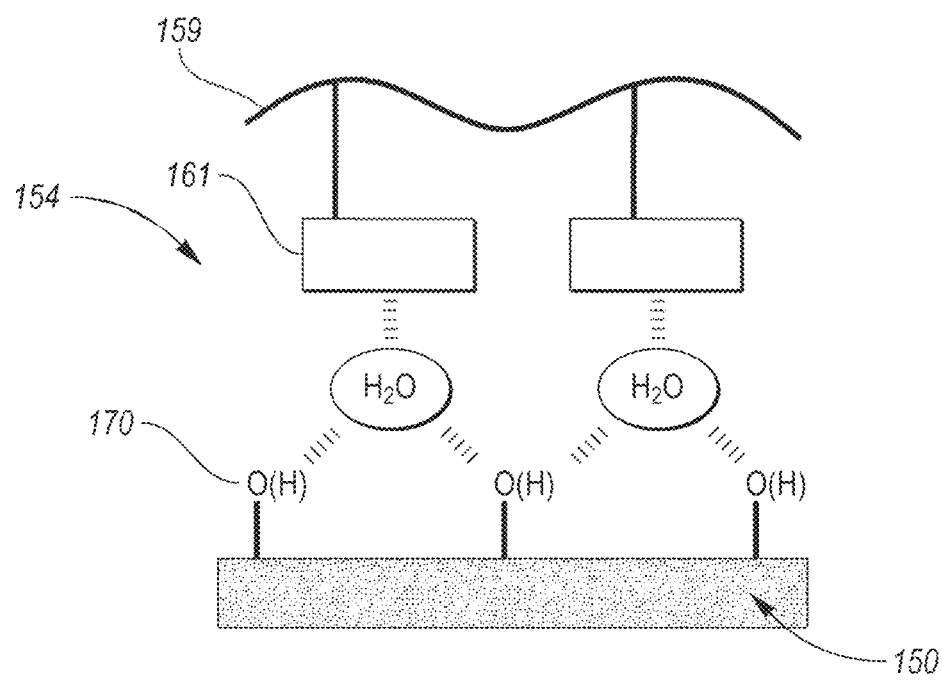
FIG. 6 shows a schematic depiction of a substrate-ionomer interface according to one or more embodiments.

The interface 166 and the substrate 150, or substrate/catalyst matrix 150/151, may include one or more surface oxygen or hydroxide terminations or termination groups 170, schematically shown in FIG. 6. The surface may thus include partially oxidized surface. As can be seen in FIG. 6, the terminations 170 strongly bind water, which in turn binds the hydrophilic groups 161 of the ionomer 152. Covalent bonds are shown with solid lines, while dashed lines denote hydrogen bonds. Hence, covalent bonds may be present between the substrate and the termination groups 170, and the hydrogen bonds may be present between the termination groups 170, interfacial water, and the hydrophilic groups 161. The termination groups 170 may be located at substrate edge sites. The binding mechanism may be via a hydrogen bond network mediated by interfacial water strongly bound to the partially oxidized surface and hydrophilic side-groups of the ionomer, as shown in FIG. 7. The substrate may thus include surface chemistry structured to bind the ionomer to the substrate along the majority or substantially the entire area of the substrate-ionomer interface.

FIG. 7A shows an ab-initio molecular dynamics (MD) simulations used to evaluate the strength of dilute, dispersed Nafion™ adsorption onto partially oxidized non-graphitic carbon. The net attractive interaction between the structure of FIG. 7A (showing sulfonate and OH-terminated non-graphitic carbon) with respect to the structure of FIG. 7B (showing a non-interacting interface between the OH-terminated carbon and PTFE) is $-0.3$ eV/SO$_3$ ($-29$ kJ/mol). FIGS. 7A and 7B illustrate the beneficial sulfonate-carbon binding, or hydrophilic group-substrate binding in contrast to the hydrophobic group-substrate binding.

In a non-limiting example, the substrate may include carbon and the termination groups may be located at carbon non-graphitic edge sites. The substrate may thus include ionomer adsorbed onto partially oxidized non-graphitic carbon.

The substrate may be functionalized. The functionalization may lead to an increase in the hydrophilicity of the support such as the carbon support. The increased hydrophilicity may lead to attraction of the interfacial water which facilitates binding of the substrate to the ionomer hydrophilic groups. The degree of functionalization should be such that substrate corrosion is not increased and electrical transport is not limited. Functionalization may be such that the water contact angle may be below about 90, 89, 88, 87, 86, 85, 84, 83, 82, 81, 80, 79, 78, 77, 76, or 75°.

Additionally or in the alternative, the CCL, porous network, the channels, the pores may include hydrophobic surfaces. At least some of the surfaces may be hydrophobic. The surfaces may be permanently hydrophobic. The hydrophobicity may be permanent, stable, unchanging, lasting, durable, enduring, invariable, continual, or a combination thereof. The CCL, porous network, or both may include a permanent hydrophobic surface throughout. The hydrophobic surfaces ensure that the water droplets forming within the network do not attach to the porous network. The hydrophobic surface helps ensure that excess water does not accumulate in the network in the form of wetting droplets. Instead, the water may congregate into non-wetting droplets which do not block the oxygen transport in the porous network of the ionomer. A non-limiting example of a non-wetting droplet is shown in FIG. 5. In turn, the hydrophobic surface minimizes or eliminates undesirable flooding, which contributes to a more effective and efficient oxygen transport through the CCL.

The herein-disclosed ionomer may provide the hydrophobicity via its backbone, its orientation, placement, and/or fixation within the CCL. The hydrophobic backbone impacts chemical stability and repeals water. The ionomer may be oriented and affixed into such position within the CCL that the hydrophobic backbone forms the outer-most layer of the thin film, the network, the CCL, or a combination thereof. In other words, the ionomer backbone and hydrophilic groups, structured to transport protons to the active catalyst sites, are not randomly oriented through the CCL. Instead, the orientation of the hydrophobic backbone, the hydrophilic side-chains or groups, or both is predetermined and locked or affixed such that the orientation does not change under operating or other conditions.

The ionomer film may have biphasic lamellar structure. The biphasic lamellar structure may be annealed, cross-linked, or both. The ionomer may have a lamellar structure with alternating layers of the hydrophobic backbone and hydrophilic side chains, as is schematically shown in FIG. 8. The outermost layer 172 of the lamellar structure or the thin film includes the hydrophobic backbone 159. The outermost hydrophobic layer 172 is affixed such that the ionomer does not reorient, and the hydrophilic groups 161 do not change position with respect to the hydrophobic backbone 159.

FIG. 8 depicts two lamellas of the hydrophobic backbone and two lamellas of the hydrophilic groups, but a different number of lamellas is contemplated. For example, one of each, 2, 3, 4, 5, 6, 7, 8, 9, 10, or more alternating lamellas are contemplated as long as the outermost layer 172 is hydrophobic.

While ionomer surface may be hydrophobic under equilibrium dry conditions, the surface may become hydrophilic after a prolonged exposure to moisture as the polymer chains rearrange to expose hydrophilic, polar side-chains to the surface moisture. To prevent this transformation and maintain the generated structure hydrophobic, the surface of the ionomer may be cross-linked. To prevent or reduce the ionomer chain reorientation and thus maintain the hydrophobic surface structure, a cross-linkable additive may be incorporated into the ionomer, forming an inter-penetrated network structure.

A method of increasing hydrophobicity of the CCL is disclosed herein. The method may include one or more steps or stages. The steps or stages may be used alone or in a combination to achieve the desired structure of the CCL, ionomer, ionomer-substrate interface, described above.

The method may include preparing a CCL by ink dispersion. The method may include mixing a powder of the carbon support and the catalyst with the ionomer in a water-solvent dispersion. The method may subsequently include blade coating, drying, or both. The method is not dependent and does not negatively affect the catalyst content or loading of the substrate.

The first step may include rendering the substrate or substrate-catalyst matrix-ionomer interface adherent to one another. The method may include improving the binding between an ionomer and the substrate. The method may include covering at least about 50, 60, 70, 80, 90, 95, 99, or 100% of the substrate surface area with the ionomer such that the ionomer adheres evenly, completely, fully to the substrate. The method may include removing any exposed hydrophilic portions of the substrate. The removing may include covering by the ionomer, terminal groups, hydrophilic groups, hydrophilic portions of the ionomer, or a combination thereof.

The method may include functionalizing or introducing functionalization to the substrate. The method may include introducing one or more terminal groups onto the surface. The terminal groups may be oxygen, hydrogen oxide, or both. The method may include introducing the terminal groups at substrate edge sites (for example in non-graphitic regions of a carbon substrate). The method may include initiating a binding mechanism between the substrate and the hydrophilic groups of the ionomer. The method may include covalently bonding the substrate to the terminal groups. The method may include bonding the terminal groups to interfacial water via hydrogen bonds. The method may include bonding the interfacial water to the hydrophilic groups of the ionomer via hydrogen bonds. The method may include introducing a binding mechanism via a hydrogen bond network mediated by interfacial water strongly bound to the partially oxidized surface and hydrophilic side-groups of the ionomer.

The first step may be conducted before an ionomer is introduced into the substrate-catalyst mixture, blade coating, drying, or both. The first step may be conducted via one or more of the following actions. The first step may include functionalization of the substrate by washing the substrate powder in a strong base or an oxidizer. A non-limiting example of a base may include an aqueous NaOH or KOH solution. A non-limiting example of an oxidizer may be a mild acid under oxidizing conditions. The first step may include functionalization of the substrate by exposing the carbon support to ozone and/or UV light for about 5-15 minutes. The first step may include functionalization of the substrate by exposing the support to an $O_2$ plasma for about 5-15 minutes, prior to the ionomer dispersion step. $O_2$ plasma works by functionalizing oxygen and hydroxide on the carbon substrate. The method may include tuning the degree of functionalization using a standard water contact angle measurement to the water contact angle discussed above. Excessive functionalization may undesirably increase carbon corrosion or decrease electrical transport.

In the second step, the method may include rendering the CCL hydrophobic or permanently hydrophobic. The method may include generating a permanent hydrophobic surface throughout the CCL pore network. The method may include promoting reorientation of the ionomer backbone and sidechains such that the sidechains face towards the substrate and the backbone is pushed away from the substrate to form the outermost layer of the ionomer film. The method may include reorientation of the sidechains and backbone of the ionomer as described herein. The method may include annealing to achieve the reorientation of the ionomer portions. The method may include driving the ionomer to assemble in a structure maximizing the surface area of the hydrophobic backbone.

The second step may follow the ionomer coating onto the substrate or substrate/catalyst matrix. The coating may produce alternating layers of the sidechains and backbone. The method may include annealing to form the outermost hydrophobic layer by pulling the backbone outward, away from the substrate and orienting the sidechains inward, towards the substrate within the thin ionomer film.

The annealing may be provided in a non-polar solvent vapor such as hexane, benzene, toluene, chloroform, or the like, or a mixed solvent vapor having a high partial pressure of non-polar solvent vapor and low partial pressure of polar solvent such as water. The method may include repelling the hydrophilic sidechains by its interaction with the non-polar solvent. The method may include adjusting, keeping, maintaining, or introducing a relatively low level of humidity to prevent the ionomer from fully dehydrating during the annealing process. The method may include tuning the temperature to prevent condensation of the solvent vapor, excessive dehydration of the ionomer, and to allow for sufficient mobility of the hydrophobic backbone to allow for the surface restructuring.

The method may include a third step of crosslinking. The cross-linking may be a surface-specific cross-linking to lock the outer backbone of the ionomer in place, preventing subsequent rearrangement of the ionomer structure, maintaining the hydrophobicity of the outermost layer of the CCL, or a combination thereof.

The cross-linking may be facilitated by inducing bonding across the ionomer hydrophilic sidechains or hydrophobic backbone. The method may include UV radiation curing of the processed film. The radiation dose and duration may be optimized so that the crosslinking is limited to the surface of the ionomer coating. Excessive cross-linking in the bulk of the ionomer could have a detrimental impact on proton transport.

Alternatively, the cross-linking may be attained by adding a cross-linkable additive to the ionomer. The method may include producing an inter-penetrated network to constrain the large-scale reordering of the ionomer film. A non-limiting example of a cross-linkable additive may be poly (vinylidene fluoride) (PVDF) polymer and divinylbenzene molecules which exhibit good mixing with Nafion™ and can be crosslinked through electron beam. The resulting PVDF/divinylbenzene network may reduce ionomer chain reorientation and thus maintain the desirable hydrophobic surface structure.

The method may also include stabilizing the hydrophobic surface structure by exposing the solvent-vapor annealed carbon/catalyst/ionomer structure to a perfluoroheptane ($C_7F_{16}$)/Ar plasma mixture.

Alternatively or in addition, another is disclosed. The interfacial chemical structure and physical and/or chemical bonds of the interface may improve oxygen transport within the CCL, contribute to homogenous dispersion of ionomer on the substrate, and/or improve chemical stability of the CCL. A non-limiting example of the interface may be seen in FIG. 9.

As FIG. 9 shows, the interface 266 includes the substrate 250 and the ionomer 252, the ionomer 252 having at least one hydrophilic group 261 and a hydrophobic backbone 259. A non-limiting example of the hydrophilic group may be $SO_3(H)$. A non-limiting example of the hydrophobic backbone may be a Nafion™ or HOPI hydrophobic backbone or chain portions. The interface 266 may include the substrate 250 covalently bonded to the ionomer 252. The interface additionally includes a compound 280 with a reactive group marked R. The compound 280 facilitates, enables, mediates, and/or provides the covalent bonding between the substrate 250 and the ionomer 252.

The compound may attach to the support 250 via the reactive group R via one or more mechanisms described below, and to the ionomer 252 via a carbon adjacent to or in close proximity to one of the hydrophilic group, hydrophobic group, backbone, sidechain, main chain, or another location along the chain of the ionomer. The compound may include one or more aromatic rings. The aromatic rings may include a simple aromatic ring such as a benzene ring. The compound may be a simple aromatic ring compound. The compound may be non-aromatic, free or aromatic rings. The compound may be an iodine-based compound. The compounds may be a grafting compound.

The compound may be a compound or composition having a leaving group X stemming from the reactive group R. After the leaving group X detaches from the compound, the covalent bond may be generated between the reactive group R and the substrate. The covalent bond may be a substrate-acetyl bond, C-acetyl bond, substrate-aryl bond, C-aryl bond, substrate-O—C bond, —C—O—C bond, substrate-O—Si— bond, —Si—O—C, substrate-NH—, C—NH— bond, or the like. The interface 266 may include the substrate 250 having a covalent bond to an aryl group, acetyl group, amine group, isocyanate group, epoxy group, or another group named herein.

Non-limiting example of the reactive groups thus include an aryl, derived from a simple aromatic ring compound where one hydrogen atom is removed from the ring, alkyl, epoxy, carboxyl, anhydride, peroxide, halogen, acyl chloride, isocyanate, amide, amine, the like, or their combination.

Non-limiting example compounds include diazonium, iodonium, silane, epoxide, carboxylic acid, anhydride, peroxide, halogen, acyl chloride, isocyanate, amide, the like, or their combination. Non-limiting examples of the leaving group include $N^+\equiv N$, $N^+$, $H^+$, $O^-$, —OH—$CR_1$=O, $Cl^-$, $I^-$, or the like.

Covalent bonding between the substrate and the ionomer enables strong adhesion between the ionomer and substrate, thus improving oxygen transport and overall efficiency and performance of the catalyst and an electrochemical cell. The herein-disclosed covalent bonds thus provide an advantage over traditional substrate-ionomer interface, which may be a carbon non-bonded interface.

Additionally, an interface having hydrogen bonds between side groups on the ionomer and the substrate surface are described above. While the hydrogen bonding is desirable over a substrate non-bonded interface, it may be beneficial to introduce a stronger bond between the substrate and the ionomer, at least in some arrangements of the electrochemical cells.

A hydrogen bond is a relatively weak attraction between a hydrogen atom carrying a partial positive charge and a more electronegative atom or group. A hydrogen bond is weaker than a covalent bond since a covalent bond is a linkage that results from the sharing of an electron pair between two atoms. The positively charged nuclei of the two atoms are electrostatically attracted to the same electrons, and the bond forms when the total energy of the bonded atoms is lower than that of two separate atoms. As a result of forming the bond lowering the total energy, a relatively high amount of energy is required to break the bond. This translates to a much higher stability of the ionomer and substrate interface compared to the stability provided by hydrogen bonding.

Covalently bonding the ionomer to the support substrate in the CCL has additional advantages beyond increased chemical stability. A functional ionomer that bonds directly to the support substrate surface may also promote a more homogeneous dispersion of the ionomer over the substrate. Inhomogeneous ionomer dispersion has been shown to lead to increased mass transport resistance. A poor ionomer dispersion may form regions of exposed support substrate which lack a facile proton conduction pathway in the absence of ionomer. Alternatively, poor dispersion may form regions with an abnormally thick layer of ionomer which increases oxygen transport resistance. Additionally, homogeneous ionomer dispersion may increase durability toward corrosion or make the material less susceptible to corrosion.

The substrate may further include one or more exposed, dangling, hydrophilic bonds, and/or hydrogen-terminated edges of the support which may contribute to oxygen transport resistance, as was described above. At least some of the dangling bonds 282 may be capped, passivated, or terminated, as is shown in FIG. 9. The substrate may thus include capped, passivated, or terminated bonds 282. Removal of the exposed or hydrophilic bonds may prevent several undesirable effects including flooding.

Passivating of the exposed bonds of the substrate may have several advantages. Exposed bonds terminated with reactive molecules may lead to unwanted side reactions during operation of the electrochemical device. Hence, passivating the bonds by terminating them with molecules that may not be removed during normal operation may prevent unwanted side reactions of the exposed bonds during cell operation. Additionally, the passivated bonds may reduce the potential for the material to be oxidized in the presence of oxygen. Thus, passivating the unused, exposed bonds may increase resistance to corrosion and efficiency of the electrochemical system.

The electrochemical system or CCL may include a substrate having all or at least some of the dangling bonds terminated. The support may thus include terminated hydrophilic bonds and covalent bonds between the substrate and the ionomer via a grafting compound.

A method of forming the covalently bonded interface discussed above is disclosed. The method may include one or more steps. The method may include functionalizing the ionomer through chemical processing to introduce the compound, grafting compound, reactive group R, or a combination thereof. A non-limiting example of the functionalized ionomer 252 prior to bonding to the substrate 250 is shown in FIG. 10. The functionalized ionomer includes a compound 280 with a reactive group R. The reactive group R has a leaving group X.

The method may further include detaching the leaving group X from the compound 280. The detaching may include electrical stimulation, heating, exposure to UV light, adding chemical reactants, generation, redirecting of an electron, or a combination thereof. The stimulation may be provided by an electron present in or supplied to the system.

The method may include attaching the functionalized ionomer to the substrate using a grafting process. The method may include breaking the bond between the reactive group R and the leaving group X. The breaking may include generating a free radical. The method may include utilizing the reactive group for the grafting. The grafting may include anionic grafting, cationic grafting, atom-transfer radical polymerization, or free-radical polymerization. A non-limiting example of a process initiating grafting may include heat processing, photochemistry, acid processing, reduction reactions, hydrolysis, electrochemical pulses, or applied voltage. The method may utilize UV processing, but undesirable biproducts and breakdown may result.

The method may include providing a voltage source, applying voltage, or both to enable deprotonation of the compound or its portion such as an acid. The voltage may be used, for example, with the carboxyl group for deprotonation of the —OH group.

The method may utilize "scissors" provided by thermal/hydrolysis treatment. The method may include removing or cutting away the anhydride bond and generating a C-acetyl bond between the substrate and the ionomer.

The method may include radical terminal alkene grafting. The method may utilize formation of a radical on the substrate surface. The method may subsequently include reacting alkene-terminated ionomer with a radical formed by benzoyl peroxide or other treatment to covalently bond the ionomer to the support.

Upon breakage of the bond between the reactive group R and the linking group X, the leaving group X may form a separate, chemically stable compound. The reactive group R may then be in a highly reactive state such that the functionalized ionomer may bind to substrate through a covalent bond shown in FIG. 9. The substrate may bond via a dangling bond, for example terminated with —OH group to the reactive group R.

The method may include shielding, masking, or otherwise covering any, all, or at least some electrocatalyst particles to prevent grafting onto the catalyst surface leading to undesirable loss of catalytically active surface area.

A schematic of a non-limiting example reaction mechanism including the compound disclosed herein is shown in FIG. 11. The example compound is a diazonium-functionalized ionomer. The reactive group may be a salt of a diazonium. A non-limiting example includes benzenediazonium bonded to the ionomer, portions of which are denoted as Z in FIG. 11. Diazonium salts have a positively charged N atom. This corresponds to high reactivity where the $N^+$ atom may readily detach from the rest of the molecule. The leaving group is represented by two N atoms bonded to the benzene ring. As can be seen in the steps of FIG. 11, initially, the functionalized ionomer includes the compound having a reactive group with the leaving group $N^+ \equiv N$. The $N^+$ from the leaving group is attacked by a free electron which results in detachment of the leaving group and a formation of a radical on the aromatic ring of the compound. Subsequently, since the free radical has rendered the aromatic group highly reactive, the ionomer is drawn to the substrate with which it bonds via a covalent bond. The product of the reaction is $N_2$ which is very stable, inert, and can be easily removed from the electrochemical cell after the grafting process.

FIG. 11 shows the ionomer having the reactive group adjacent to a hydrophilic sulfonate group on the ionomer. Other placements or configurations of the reactive group R within the ionomer chains is contemplated and depicted in FIGS. 12A-C.

Figure 13A:
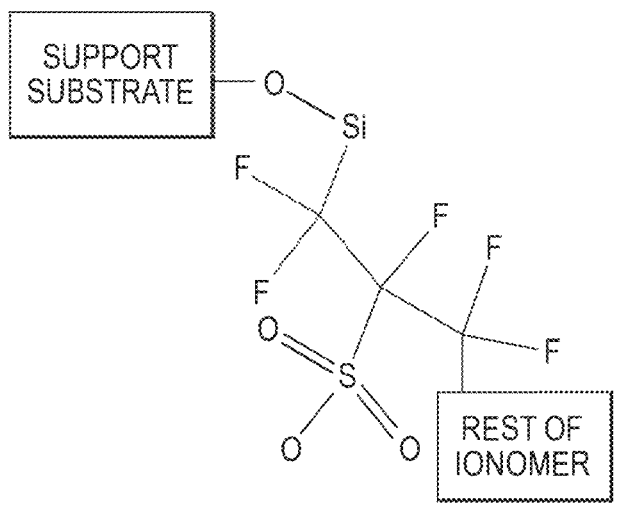
Figure 13B:
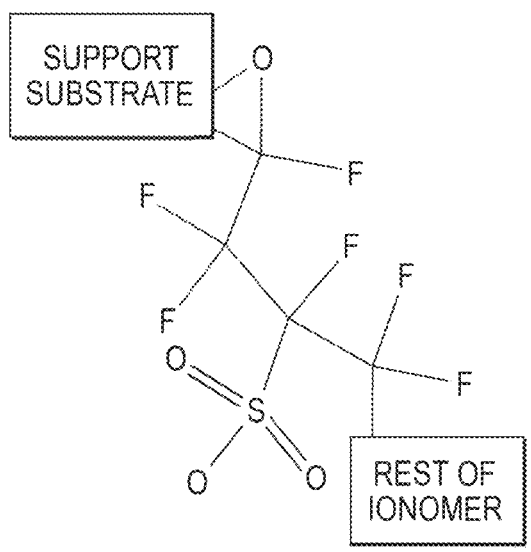
Figure 13C:
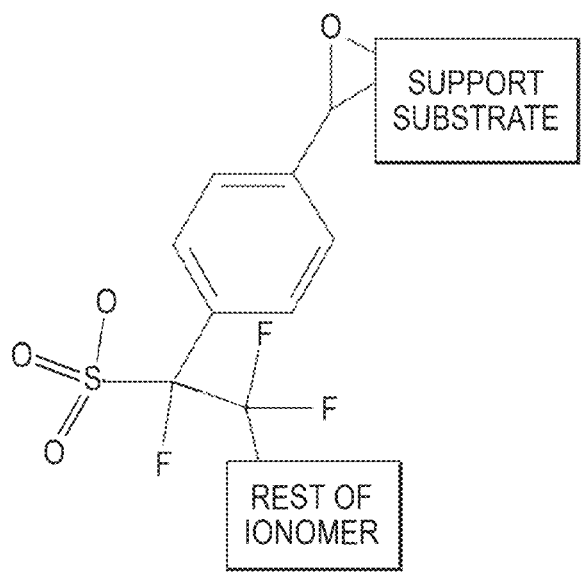

Alternative grafting chemistries may include silane, forming —Si—O—C bonds, the final product shown in FIG. 13A; epoxies forming —C—O—C-bonds, the final product shown in FIGS. 13B, 13C; carboxyl, the final product shown in FIGS. 13D and 13E; anhydride, the final product shown in FIG. 13F, or alkene, the final product shown in FIG. 13G. Although fluorinated polymers are depicted in FIGS. 12A-C and 13A-G, other chemistries for ionomers are possible in substitution or combination, such as hydrocarbons, arenes, and amides.

The method may further include passivating of the dangling or exposed bonds. The method may utilize small molecules structured to terminate the dangling bonds and not be removed during normal operation of the electrochemical cell. Non-limiting examples of passivation techniques include halide termination via immersion in weak halide acid; aryl termination via further diazonium exposure; termination with single atom catalysts such as Fe, Co, Ni, or Cu, radical scavengers such as Ce, or an organometallic complex thereof; carbon monoxide termination; a plasma, vacuum, ultraviolet, or annealing process; or the above in combination with a voltage applied to the substrate to electrochemically activate the passivation reaction.

Further, alternatively or in addition, a catalyst support, modified to enhance oxygen diffusion in nanopores, is disclosed. The modified surface introduces an enhanced pore roughness. Without limiting the disclosure to a single theory, it is believed that the herein-disclosed roughened morphology of the surface of the support substrate pores may provide a surface diffusion pathway for gaseous species in confined media such as the pores of an electrocatalyst support. Thus, increasing the surface roughness of the support via chemical, thermal, electrochemical, or other means may help alleviate transport hindrance typically observed for high surface area carbon (HSAC) supports.

As depicted in FIG. 14, a traditional CCL 54 includes a nanoparticle/electrocatalyst 51 deposited on top of a support 50 that is electronically conductive. The electrocatalyst 51 and or support may be dispersed in an ionomer 52 surrounding the catalyst/support matrix 50/51. Each component of the CCL plays a unique role. The electrocatalyst 51 may catalyze the reactions, the support 50 may provide mechanical and electrical stability for the electrocatalyst 51, and the ionomer 52 may transport the reactant and product species to and from the electrocatalyst 51. As can be seen from FIG. 14, the support surface is typically a smooth, undulating surface free of abrupt changes in its morphology.

One challenge of the CCLs has been ensuring high levels of mass transport that are needed for the reactions at high current densities. An ionomer-related attempt to solve the transport levels was a substitution of HOPIs for Nafion™ and other ionomers. Such substitution reduces the equivalent weight, reduces the side chain lengths, and introduces more rigid structures to the ionomer backbone. But the weakness of such substitution stems from the adsorption of the ionomer backbone, side-chains, and/or functional groups to the surface of the catalyst. The adsorption can hinder activity through steric effects. In other words, the adsorption creates a metaphorical traffic jam, where reactants are impeded from reaching or leaving the electrocatalyst. Another attempt to solve the transport challenge is the use of HSACs characterized as those having high fractions of micro- and mesoporosity. HSACs strive to remove the contact between the catalyst and ionomer. But removing the contact manifest as higher transport resistances.

Thus, there is a need for a support substrate facilitating oxygen transport to the electrocatalyst, enabling high levels of mass transport at high current densities, and providing a good structural support for the electrocatalyst at the same time.

The catalyst support disclosed herein may have porosity formed by a plurality of pores. The pores may be key to the mass transport of products and reactants of the electrochemical cell reactions described herein. The pores may be classified into three general groups: micropores, which have a diameter of less than about 2 nm, mesopores, which have a diameter between about 2 and 50 nm, and macropores, which have a diameter greater than about 50 nm.

From a pore size distribution perspective, the substrate may include at least some, majority of, or predominantly pores dimensioned to fit electrocatalyst particles but prevent infiltration by the ionomer. The catalyst support may have the greatest amount of mesopores, micropores, pores having a diameter smaller than about 10 nm, or a combination thereof. The mass or volume of macropores in the herein-disclosed support may be about, at least about, or at most about 30-70, 40-60 or 50-55%, based on the total mass or volume of substrate pores. The mass or volume of mesopores and micropores in their combination may be about, at least about, or at most about 30-70, 40-60, or based on the total mass or volume of substrate pores. Other particle pore distributions are contemplated.

The pore distribution may enable homogenous dispersion of the ionomer on the substrate, support electrocatalyst particles, prevent blockage of the electrocatalyst by the ionomer sidechains, thus optimizing proton transport. The pores may be wide enough and shallow enough to enable efficient oxygen transport to the electrocatalyst without incurring transport losses from excessive tortuosity. The pores width and depth should also be such that the electrocatalyst particles may be housed within the pores.

In pores with a diameter greater than about 20 nm, diffusion of molecular oxygen within the pore is dominated by oxygen's interactions with water. In pores having a diameter of about 20, 15, or 10 nm or less, diffusion is affected by molecular oxygen's interactions with walls of the pores in addition to the oxygen and water interactions. It was surprisingly discovered that roughening of the pore wall surfaces introduces and/or increases the oxygen-wall interactions, adsorbing molecular oxygen to the surface of the walls where the electrocatalyst particles are located, and forming a boundary layer adjacent to or in proximity of the pore wall surfaces. The adsorption also increases the overall solubility of the confined water, boosting the overall permeability of the pores.

The principle is demonstrated in FIG. 15 showing a catalyst support 350 having a roughened surface 384. As can be seen, a greater volume of molecular oxygen 386 is present below a boundary line B, in close proximity to the roughened surface 384 than above the boundary line. The area between the roughened surface of the first surface morphology 384 and the boundary line B is the boundary layer 387. This phenomenon develops despite the area/volume underneath the boundary line B being less than the area/volume above the boundary line B.

The support substrate may include a first surface morphology and at least a second surface morphology. The first surface morphology is a surface morphology of the one or more pores, at least some of the pores, the micropores, mesopores, or a combination thereof. The first surface morphology is a pore morphology. The first morphology 389 may include a roughened surface architecture, arrangement, framework, surface geometry, non-limiting example of which is shown in FIG. 16. The first morphology surface may be uneven, irregular, having height variability or deviations, indentations, asperities, projections, lumps, non-flat areas, warped surface, the like, or a combination thereof. As FIG. 16 shows, the first morphology may have a profile showing one or more walls 390, peaks 391, and valleys 392. The walls 390 may be steep, gradually sloping, abrupt, regular, irregular. The walls 390 may form peaks 391 and valleys 392. The peaks 391 may form crests, projections, protrusions, lumps, indentations. The valleys 392 may form cavities, concavities, dents, concave surface.

The peaks 391 and valleys 392 may have the same or different dimensions, shape, configuration throughout the first surface morphology. For example, at least some of the peaks and valleys may differ in height, width of the peak at the top, at the base, or both. At least some or all of the peaks and/or valleys may have the same dimensions or shape.

The peaks 391 and valleys 392 may form a pattern. The peaks may form a continuous, interconnected series of peaks in a line, as is shown in FIG. 17 or 18C. The pattern may be regular, irregular, repeating, continual, interrupted, uninterrupted. The pattern may resemble a mountain range, a tire tread, dispersed islands, or the like. More than one pattern may be provided on the same first surface morphology. A non-limiting example of the mountain range-like first surface morphology 389 is shown in FIG. 17. A regular tire tread-like first surface morphology 389 is shown in FIG. 18A-18C. Alternatively patterns of the first surface morphology may include alligator skin-like morphology or bone marrow-like morphology.

A single catalyst support may have one or more patterns of a roughened surface morphology. One or more supports of the same CCL or electrochemical cell may have the same first surface morphology. Alternatively, each or at least some catalyst supports may differ in their first surface morphology.

The peaks and valleys may alternate in a regular, irregular, repeating way or pattern. The peaks and valleys may form waves. The waves or waviness relates to peak-to-peak spacing which may be regular or irregular. The pattern of peaks and valleys may form oscillations or a repetitive pattern having the same repetitive or periodic variation. The wavelength and frequency of the repeating pattern may be regular throughout the support area. Wavelength refers to the distance between two adjacent peaks. Frequency refers to a number of repeating peaks per a set distance. A high frequency may be about 0.5 or more peaks per 1 nm. A low frequency may be less than 0.5 peaks per 1 nm. The wavelength, frequency in one or more patterns described herein may be the same or different throughout the entire support area. The wavelength, frequency may be consistent or inconsistent. The pattern may be a sinusoidal pattern. The pattern may include consistent, high frequency, short spatial wavelength oscillations, at least some longer-wavelength variations, or a combination thereof. The first surface morphology may include low frequency asperities, making the surface appear smooth overall, but being rough on a smaller scale.

The support substrate may also include a second surface morphology which may be free of peaks, valleys, series of peaks, or a combination thereof. The second surface morphology may be relatively smooth, having an even and regular surface or consistency, being free from perceptible projections, lumps, or indentations. The second surface morphology may be substantially level, having the same height throughout the support area.

A surface roughness may be defined as Ra. The first surface morphology may have a greater value of Ra than the second surface morphology. A non-limiting example of the first surface morphology 389 and the second surface morphology 395 is shown in FIG. 19A. The first surface morphology 389 is located in a first pore 396 of a catalyst support 350 in comparison to the second surface morphology 395, located outside of the first pore 396 and inside of a second pore 396'. The first surface morphology 389 has a Ra1 value which is greater than Ra2 of the second surface morphology 395. The first pore 396 may be a mesopore or micropore. The second pore 396' may be a macropore or a mesopore with a diameter greater than about 10 nm.

The electrocatalyst particles 351 may be contained or housed on the first surface morphology, along, on, at, between the profile peaks, valleys, ranges, and/or walls. A non-limiting example of the electrocatalyst attachment is shown in FIG. 16. Another non-limiting example of the electrocatalyst being attached or adhered to the second surface morphology of a pore is shown in FIG. 19B. In FIG. 19B, a plurality of electrocatalyst particles are attached to the inner walls of the pore 396. The inner walls have a first surface morphology 389 featuring peaks 391 and valleys 392. The profile of the pore 396 includes a roughened surface having Ra1. The specific placement of the particles 351 within the pore 396 shown in FIG. 19B is only exemplary. The electrocatalyst particles may be located at the top, middle portion, or bottom of the pores. The increased roughness enables better attachment of the particles to the walls of the pores than in a pore with lower roughness or the non-pore surface of the substrate having second surface morphology denoted Ra2.

The electrocatalyst particles may be attached to the second surface morphology. Such attachment may be weaker than attachment to the first surface morphology featuring the greater roughness. Hence, it may be desirable to house the electrocatalyst particles, or a majority of the electrocatalyst particles in the pores having the first surface morphology.

The first surface morphology may have a length of the entire pore length. Alternatively, a portion of the pore may include a first surface morphology and at least one different portion may include the second surface morphology. The pores having the first surface morphology may have a diameter of about 2-10, 1.8-9, or 1.5-8 nm, a depth of about 0.5-15, 1-12, or 2-10 nm, or a combination thereof.

A method of forming the first surface morphology is disclosed herein. The method may include one or more steps. The method may include forming the roughness. The roughness may be predetermined, specifically designed, randomly formed. The method may include forming pores. Alternatively, the method may include roughening a substrate having pores. The pore-size distribution may be engineered by tuning the degree of the relevant technique by modifying the duration and energy of the process.

The method may include using a shield or mask to protect one or more regions and/or pores of the substrate from roughening. As a result, the final substrate may include first surface morphology or roughness and second surface morphology or roughness discussed above.

The method may include physically ablating the roughened surface from the support surface. Non-limiting techniques to achieve such ablation may include using heat, high-energy ions, or mechanical milling. Additionally or alternatively, the method may include adding a support material to the existing support surface to increase height, form peaks, valleys, ranges, and overall create a roughness. Nonlimiting material addition techniques may include atomic layer deposition, chemical vapor deposition, sputtering, or surface adsorption of organic molecules such as hydrocarbons, graphene, graphite, the like, or their combination.

The method may also, or alternatively, include electrochemical roughening of the surface through pre-corrosion. The method may include applying a high voltage to the support and/or subjecting the support to an acidic environment. Using either of these techniques may oxidize and detach a selection of carbons. The method may include exposing the support surface to reactive ions such as reactive ion etching (RIE) or exposure to a reactive vapor to create the first surface morphology. The vapor may include other small molecules to react with the surface such as hydrocarbons or molecules with aromatic rings. Some of the molecules may remain at the end of the processing to prevent corrosion.

The method may include altering the support to have a different hierarchy of pore structures including micropores, mesopores, and macropores. This change in hierarchy of pore structures may be achieved by changing process conditions such as ion etching, chemistry, and mechanical milling that may affect the ratio of micro and meso porosity.

When the support is a carbon-based support, additional techniques may be used to minimize corrosion. The method may include passivating the substrate. The passivating may include exposing the support to a vapor or solution of small molecules that will terminate the dangling bonds in the surface. The small molecules may be chosen to prevent corrosion. Examples of such molecules may include, but are not limited to, non-soluble carbon or halides. The passivating may include thermal, plasma, vacuum, ultraviolet, or annealing processes to terminate the dangling bonds in the carbon surface. The passivating may be electrochemically activated. The method may include applying voltage to induce bond formation between the dangling bonds on the carbon surface and reactive molecules in the surrounding electrolyte. A non-limiting example of the reactive molecules may include diazonium salts.

Electrocatalysts play crucial role in the electrochemical cells as they enable the HOR, HER, ORR, and OER reactions. Electrocatalysts are typically included in a form of particles. To increase their stability and prevent their loss via dissolution or detachment, the electrocatalysts may be attached to a support, for example as was described above. The most frequently used catalysts are noble metals such as platinum (Pt), palladium (Pd), or their combination as well as Pt alloys PtM, where M is a transition metal.

Electrocatalyst durability in electrochemical processes is a topic of great interest to guarantee stable performance of the electrochemical cells and devices. For example, stability of Pt nanoparticles (NPs) in PEMFC is a major technological challenge for PEMFC commercialization. Pt dissolution is typically observed when PEMFC operation is cycled into oxide formation voltage (>0.9V).

A carbon-supported electrocatalyst is currently the most widely used electrocatalyst in PEMFC and is a major contributor to PEMFC cost. Despite its maturity and improved performance, lifetime and stability of PEMFC are greatly limited by the catalyst corrosion and degradation processes occurring on the surface of the catalyst, resulting in mass loss, structural evolution, and/or reduction in catalytically electrochemical active surface area (ECSA). In addition, noble metals such as pure Pt are very costly.

The alternative electrocatalysts such as Pt alloys may provide cost savings, but they face challenges such as lower durability and undesirable change in catalytic activity with degradation of the alloy. In other words, the alloy electrocatalysts may not have a substantially constant performance throughout the life of the alloy electrocatalyst.

Overall, there is a need for an improved, more stable, less costly electrocatalyst with an overall stable performance for electrochemical cell use.

In one or more embodiments, an electrochemical cell system is disclosed. The system may be a fuel cell or an electrolyzer and include components described above. The system includes an electrocatalyst in the CCL, anode catalyst layer, or both which may be referred to as a "multi-catalyst."

The multi-catalyst may refer to a system of at least two types of electrocatalysts which differ from one another by chemical composition, structure, dimensions, function, physical properties, chemical properties, placement within the system, or a combination thereof.

For example, the multi-catalyst system may include a first electrocatalyst which may be more stable but may be more costly for the same amount of catalytic activity than the second electrocatalyst. A non-limiting example of a costly yet more durable first electrocatalyst may be pure Pt, Pd, or their combination. The first electrocatalyst, due to its durability, may be placed, housed, or attached onto a non-porous surface region of the substrate. The non-porous surface region may be pore-free surface region or outer surface region. Since the first electrocatalyst binds strongly to the non-porous surface region, the relatively exposed location of its attachment on the outer, pore-free, non-porous surface region may be optimal. The first electrolyte may have a higher catalytic activity than the second electrocatalyst per the same mass/mass unit.

To provide manufacturing cost savings, a second electrocatalyst may be introduced such that the loading of highly catalytically active pure noble metal may be lowered without sacrificing the overall catalytic activity of the electrocatalyst system, the CCL, and/or the cell. The second electrocatalyst may be less costly but also less durable or more prone to degradation than the first electrocatalyst. A non-limiting example of the second electrocatalyst may be a PtM alloy, where M may be a transition metal. The second electrolyte may have a lower catalytic activity than the first electrocatalyst per the same mass/mass unit.

Since the second electrocatalyst is more prone to degradation, its placement may be different from the first electrocatalyst. The second electrocatalyst may be placed in relatively sheltered or protected portions of the support substrate. Such portions may include the porous portions of the substrate. The porous portions may include a plurality of pores including macropores, mesopores, and/or micropores. The porous portions may include a porous surface region. The second electrocatalyst may be housed by at least a portion of the pores, in the cavities of the pores, each cavity being defined by a wall. The second electrocatalyst may be housed in mesopores only. The second electrocatalyst may be housed in mesopores and micropores. The second electrocatalyst may be housed in at least about 30, 40, 50, 60, or 70% of the pores, based on the total number of pores of the support substrate area.

The second electrocatalyst may be located on the walls of the pores, at the bottom of the pores, at the top of the pores, or a combination thereof, as is shown in FIGS. 21A, 21B. The surface of the pores may be modified as was described above to increase adhesion.

It is contemplated that the first electrocatalyst may be located in at least some of the pores, for example macropores besides being located on the outer surface region of the support substrate. It is also contemplated that at least some particles of the first electrocatalyst may be located adjacent to or directly adjacent to one of the pores such as on an external surface of the pores, as is depicted in FIG. 21B. Alternatively, the first electrocatalyst may be predominantly located at a distance from the pores, the distance being greater than a macropore, mesopore, and/or micropore diameter.

It is also contemplated that at least some of the pores may include a mixture or blend of the first and second electrocatalyst. The blend may include up to about 30% of the first electrocatalyst, based on the total number of electrocatalyst particles in the pore.

A concentration of the first electrocatalyst particles along or within the area of the outer surface region of the support substrate may be uniform or regular. Alternatively, the spacing or concentration may be irregular. A higher concentration of the first electrocatalyst may be in a proximity or close proximity of one or more pores.

Additionally, concentration of the second electrocatalyst may be the greatest in the pores. But at least some of the second electrocatalyst particles may be located on the outer surface of the pores, on one or more outer edges of the pores, on the outer or external surface of the pores, or a combination thereof, as is indicated in FIG. 21B.

The support substrate and/or the multi-catalyst system may thus have one or more areas having both the first and second electrocatalysts. The one or more areas may include the pore edges, external portions of the pores, outer surface-pore interface, or their combination.

FIG. 20 shows a non-limiting example of a multi-catalyst system 499 implemented on a support substrate 450. The multi-catalyst system includes a first electrocatalyst 497 located on the non-porous surface region of the support substrate 450. The multi-catalyst system 499 includes a second electrocatalyst 498 located in a plurality of pores 496. The pores may include an electrolyte. The electrolyte may the same or different as the electrolyte in contact with the non-porous outer surface. The pores may have roughened surface. The pores may have the same or different dimensions, height, width, depth, roughness, shape, configuration.

The pores may have gradually sloping walls 473 from the outer surface towards the pores. The pores may have walls having an angle of about 45-135 degrees with respect to the outer surface. The pores may be large enough to house one or more particles of the second electrocatalyst. The one or more may be about 1-10, 2-8, or 3-5 particles. The second electrocatalyst particles may be accumulated, dispersed, evenly dispersed, randomly located within the pores.

FIG. 21A shows an alternative view of a non-limiting example of a multi-catalyst system 499. The system includes a first electrocatalyst 497 located on the non-porous surface region 471 of the support substrate 450. The system also includes a second electrocatalyst 498 located or housed in various depths of the depicted pore cavity 496. In the non-limiting example of FIG. 21A, the second electrocatalyst particles 498 are smaller in diameter than the particle of the first electrocatalyst 497 and are dispersed towards the bottom portions of the pore cavity 496.

In the context of the CCL, the pores are filled with an electrolyte such as ionomer 452. The same or different ionomer may be in contact with or surround the outer surface of the support substrate 450 and the inner volume of the pores 496, which is further discussed below.

In a non-limiting example of FIG. 21B, the first electrocatalyst is located on the outer surface region of the support substrate 450, but also on a top edge of a wall 473 defining a pore 496. The first electrocatalyst particle 497 is thus directly adjacent to the pore 496. The electrocatalyst particle 497 may alternatively be a particle of the second electrocatalyst 498. In the non-limiting example of FIG. 21B, the second electrocatalyst particle 498 has a larger diameter than the first electrocatalyst particle 497, and the pore shape keeps the second electrocatalyst particle 498 sheltered.

The ratio of the first:second electrocatalyst, or vice versa, may be about 1:1, 1;2, 1:3, 1:4, 1:5, 1:6, 1:7, 2:3, 4:5, or the like. The support substrate, the CCL, the cell, the system may include about the same volume of the first and second electrocatalyst. Alternatively, a volume of the first or second electrocatalyst may be higher than the volume of the other electrocatalyst.

Further, it is contemplated that more than two types of catalyst may be present in the system. For example, different types of alloy-based catalysts may be included in the porous cavities, on the non-porous surface, or both.

The support substrate having the multi-catalyst system may be prepared by one or more methods such as atomic layer deposition, chemical vapor deposition, sputtering, or other techniques used to deposit an electrocatalyst on the substrate. A shield or mask may be used if the electrocatalysts are applied separately. A shield or mask may be also applied over the one or more pores when the first electrocatalyst is being applied to the outer surface. Another shield or mask may be applied over the outer surface of the substrate when the second electrocatalyst is being applied to the pore surfaces.

To further optimize performance of the electrochemical cells and improve oxygen transport within the CCL, a multi-electrolyte may be introduced into the system.

The multi-electrolyte may include more than one type of electrolyte within the CCL. The multi-electrolyte may include a first electrolyte and a second electrolyte which may differ by chemical composition, internal structure, function, physical properties, chemical properties, placement within the system, or a combination thereof.

For example, the first electrolyte may be an electrolyte structured to have a good proton transport, or proton conductivity, but being less effective in preventing electrocatalyst degradation than the second electrolyte, having lower oxygen conductivity, or both. A non-limiting example of the first electrolyte may be Nafion™ or the like. The first electrolyte may be located outside of the porous portions of the substrate support, be in direct contact with the outer, non-porous surface region of the substrate support, and/or be closely adhered to the non-porous surface region of the substrate support.

The second electrolyte may be structured to prevent electrocatalyst degradation, secondary metal leaching out of PtM alloys, transport, or a combination thereof. The second electrolyte may be structured to have a lower capability to transport protons or proton conductivity, greater ability to transport oxygen or oxygen conductivity, than the first electrolyte, or both. The second electrolyte may be located in at least some or all of the pore cavities within the porous structure of the substrate support. The second electrolyte may be an ionic liquid, HOPI, or the like. The second electrolyte may have a greater support substrate affinity or adhesion than the first electrolyte. The second electrolyte may be thus structured to remain located within the pores of the porous region for the lifetime of the cell via adhesion, capillary forces, or their combination.

The first and second electrolytes may be miscible. The first and second electrolyte may include a mixture of the first and second electrolyte with a ratio of about 1:1, 1:2, 1:3, 1:4, 1:5, 1:6, 1:7, 1:8, 1:9, 1:10, 2:3, 4:5, or the like of the first to second or second to first electrolytes. The mixture or blend may be present in at least some portions of the CCL such as in a surrounding of or directly adjacent to the pores, at the first electrolyte-second electrolyte interface, or both. The concentration of either electrolyte at the interface may gradually increase towards the main volume of the same electrolyte.

The CCL may thus include at least a first concentration $c1$ of the first electrocatalyst and a second concentration of the first electrocatalyst. The first concentration $c1$ is a concentration of the first electrolyte at the outer surface of the substrate support, within the CCL space free of substrate pores, or both. The second concentration $c2$ is a concentration of the first electrolyte adjacent the second electrolyte, the pore cavity, the pore top surface, or a combination thereof. The second concentration $c2$ may be lower than the first concentration $c1$.

The CCL may include at least a first concentration $c3$ of the second electrocatalyst and a second concentration $c4$ of the second electrocatalyst. The first concentration $c3$ is a concentration of the first electrolyte at the first electrolyte-second electrolyte interface, in the top portion of the pore cavity, at the outer external edges of the pore, or a combination thereof. The second concentration $c4$ is a concentration of the first electrolyte within the pore, at the middle portion of the pore cavity, at the bottom portion of the pore cavity, at the walls of the cavity, or a combination thereof. The second concentration $c4$ may be greater than the first concentration $c3$.

Alternatively, to prevent intermixing of the electrolytes at the interface, the pores may be capped with a material. It is also contemplated that the entire support may be capped. The cap may be a layer, coating, or both. The cap is structured to physically separate the first electrolyte from the second electrolyte. The material may be permeable to protons, $O_2$, and water to prevent any unwanted transport hinderances or blockages. The material may be impermeable to the first electrolyte, the second electrolyte, or both. Non-limiting example material may include a carbon-based coating, graphene, or both.

The CCL, the cell, or the system may include a greater volume of the first electrolyte than the second electrolyte. This is due to the fact that the second electrolyte may be reserved for the pore cavities.

In a non-limiting example of FIG. 22, a portion of a CCL 454 includes a first electrolyte surrounding the support substrate. The first electrolyte 481 may have a first proton conductivity and a first rate of electrocatalyst dissolution prevention. The CCL 454 also includes a second electrolyte 483 located in the cavities of the pores 496. The second electrolyte 483 may have a second proton conductivity and a second rate of electrocatalyst dissolution prevention. The first proton conductivity is greater than the second proton conductivity. The first rate of electrocatalyst dissolution prevention is lesser than the second rate of electrocatalyst dissolution prevention. The first and second electrolyte form a first electrolyte-second electrolyte interface 485 having one or more properties described above.

FIG. 22 also depicts non-limiting examples of electrocatalyst placement. The electrocatalyst may be on the outer surface region of the substrate support 450, in the pore cavities 496 of the porous region, or both. The pores and electrocatalyst particles may have one or more properties described within the specification.

In an alternative depiction of the multi-electrolyte system of FIG. 23A, the substrate support 450 is depicted with a pore 496. The pore cavity is filled with a second electrolyte 483. The first electrolyte 481 is shown surrounding the substrate support 450 and the pore 496. The first and second electrolyte form a first electrolyte-second electrolyte interface 485.

The first electrolyte-second electrolyte interface is shown and denoted 485 in FIG. 23A. The first and second concentrations $c_1$, $c_2$ of the first electrolyte and the first and second concentrations $c_3$, $c_4$ of the second electrolyte are indicated.

In an alternative embodiment, the electrolyte concentration fluctuations or differences within the CCL are eliminated or minimized by an introduction of a cap 475 shown in FIG. 23B over the pores 496. The cap 475 may prevent contact of the first and second electrolyte as was explained above.

An alternative form of the cap 475' is shown in FIG. 24. As can be seen in FIG. 24, the cap 475' extends across the entire area of the substrate support such that the first electrolyte 481 is in contact with the cap 475' instead of the substrate support 450. The cap 475' may prevent formation of the first electrolyte-second electrolyte interface. The cap or coating may be applied selectively over one or more portions of the support substrate, not covering the entire area of the support substrate, but substantially large regions of both the porous and non-porous regions.

In at least some embodiments, it is contemplated that only some of the pores out of the total porosity of the support substrate may include the second electrolyte. The pores including the second electrolyte would be the pores containing electrocatalyst particles. At least some of the pores may be free of electrocatalyst particles and may include a first electrolyte.

It is also contemplated that more than two electrolytes may be introduced into the system. For example, some of the pores may be filled with a third electrolyte having beneficial properties tailored for a specific kind of electrocatalyst.

A method of forming the multi-electrolyte system is disclosed herein. The method may include first filling the pore cavities with the second electrolyte described above. The method may include filling the pores fully such that the entire volume of the pores is filled with the electrolyte. Subsequently, a first electrolyte may be applied onto the non-porous surface region and over the filled pores to form a first electrolyte-second electrolyte interface.

The method may include selectively applying the second electrolyte to a first portion of the pores of the support substrate. The method may also include leaving some of the pores free of the second electrolyte. The method may include applying the second electrolyte to the pores containing electrocatalyst particles. The method may include utilizing a mask to cover pores and/or regions which are to remain second electrolyte-free.

Alternatively, prior to an application of the first electrolyte within the volume of the CCL, a cap or coating described herein may be applied selectively over the pores and/or non-porous regions containing the second electrolyte. Alternatively still, the method may include applying a cap or coating over a partial or entire surface area of the support substrate including the porous and non-porous region.

The following applications are related to present application: U.S. patent application Ser. Nos. 17/841,840, 17/841,955, 17/841,973 and 17/841,977 (RBPA 0389, 0401, 0403, and 0404 PUS), filed on Jun. 16, 2022, which are incorporated by reference in their entirety herein.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An electrochemical cell cathode catalyst layer comprising:
   electrocatalyst particles;
   an electrocatalyst support having an electronically conductive porous material including a surface morphology comprising
   a plurality of micropores with a diameter of less than about 2 nm having a roughened inner pore wall surface of a first surface roughness and including a plurality of peaks and valleys, and
   a plurality of mesopores with a diameter of more than about 10 nm having a roughened inner pore wall surface of a second surface roughness including a plurality of peaks and valleys, the first surface roughness being greater than the second surface roughness,
   the surface morphology being configured to contain the electrocatalyst particles within the plurality of pores and to enhance mass transport of molecular oxygen to the electrocatalyst particles by adsorbing molecular oxygen to the surface morphology; and
   an ionomer adhered to the electrocatalyst, the electrocatalyst support, or both.

2. The cathode catalyst layer of claim 1, wherein the conductive porous material includes a combined volume of the plurality of mesopores and the plurality of micropores of about 50-55%, based on the total volume of pores of the conductive porous material.

3. The cathode catalyst layer of claim 1, wherein the surface morphology further includes additional peaks and valleys forming a continuous, interconnected series of peaks in a line.

4. The cathode catalyst layer of claim 1, wherein the surface morphology further includes additional peaks and valleys in a wavy pattern with a periodic variation of about 0.5 or more peaks/1 nm.

5. The cathode catalyst layer of claim 1, wherein the catalyst support is a carbon-based electrocatalyst support.

6. The cathode catalyst layer of claim 1, wherein the electrocatalyst support further includes a plurality of macropores and is configured to contain the electrocatalyst particles only within the plurality of micropores, mesopores, and macropores.

7. The cathode catalyst layer of claim 1, wherein the pluralities of micropores and mesopores have a variable depth of about 0.5-15 nm.

8. The cathode catalyst layer of claim 1, wherein the surface morphology includes about 10 to 50% of peaks having an equal height.

9. The cathode catalyst layer of claim 1, wherein pores of the plurality of micropores have a variable depth.

* * * * *